US009209989B2

(12) United States Patent
Atluri et al.

(10) Patent No.: US 9,209,989 B2
(45) Date of Patent: *Dec. 8, 2015

(54) CAUSATION OF A DATA READ OPERATION AGAINST A FIRST STORAGE SYSTEM BY A SERVER ASSOCIATED WITH A SECOND STORAGE SYSTEM ACCORDING TO A HOST GENERATED INSTRUCTION

(75) Inventors: Rajeev Atluri, Corona, CA (US); Anup S. Tirumala, San Jose, CA (US)

(73) Assignee: InMage Systems, Inc., Santa Clara, CA (US)

( * ) Notice: Subject to any disclaimer, the term of this patent is extended or adjusted under 35 U.S.C. 154(b) by 899 days.

This patent is subject to a terminal disclaimer.

(21) Appl. No.: 12/344,320

(22) Filed: Dec. 26, 2008

(65) Prior Publication Data
US 2010/0169452 A1 Jul. 1, 2010

Related U.S. Application Data

(60) Division of application No. 11/229,289, filed on Sep. 16, 2005, now Pat. No. 8,055,745, which is a continuation-in-part of application No. 10/859,368, filed on Jun. 1, 2004, now Pat. No. 7,698,401.

(51) Int. Cl.
 G06F 15/16 (2006.01)
 H04L 12/413 (2006.01)
(52) U.S. Cl.
 CPC .................................. *H04L 12/413* (2013.01)
(58) Field of Classification Search
 USPC ........................................................ 709/230
 See application file for complete search history.

(56) References Cited

U.S. PATENT DOCUMENTS

| 5,193,181 | A | 3/1993 | Barlow et al. |
| 5,313,612 | A | 5/1994 | Satoh et al. |
| 5,446,871 | A | 8/1995 | Shomler et al. |
| 5,621,882 | A | 4/1997 | Kakuta |
| 5,664,189 | A | 9/1997 | Wilcox et al. |
| 5,805,785 | A | 9/1998 | Dias et al. |
| 5,875,479 | A | 2/1999 | Blount et al. |

(Continued)

FOREIGN PATENT DOCUMENTS

WO    WO-2004021677  A1    3/2004

OTHER PUBLICATIONS

U.S. Appl. No. 11/405,236, filed Oct. 18, 2007, Michael et al.

(Continued)

*Primary Examiner* — Esther B Henderson
(74) *Attorney, Agent, or Firm* — Ben Tabor; Doug Barker; Micky Minhas

(57) ABSTRACT

Methods and systems of causation of a data read operation against a first storage system by a server associated with a second storage system according to a host generated instruction are disclosed. In an embodiment, a method of causing a data read operation against a first storage system, the data read operation performed by a server associated with a second storage system according to a machine-readable instruction generated by a host directly associated with the first storage system. The method further includes saving data from the host to the first storage system, creating a record of at least one data write comprising the data saved to the first storage system, and using a variable contained in the record to process a mapping scheme resulting in knowledge of at least one physical offset in the first storage system to receive the at least one data write.

20 Claims, 19 Drawing Sheets

(56) References Cited

U.S. PATENT DOCUMENTS

| | | | |
|---|---|---|---|
| 5,930,824 A | 7/1999 | Anglin et al. | |
| 5,987,506 A * | 11/1999 | Carter et al. | 709/213 |
| 6,175,932 B1 | 1/2001 | Foote et al. | |
| 6,247,141 B1 | 6/2001 | Holmberg | |
| 6,260,120 B1 * | 7/2001 | Blumenau et al. | 711/152 |
| 6,269,431 B1 | 7/2001 | Dunham | |
| 6,324,654 B1 | 11/2001 | Wahl et al. | |
| 6,327,579 B1 | 12/2001 | Crawford | |
| 6,490,691 B1 | 12/2002 | Kimura et al. | |
| 6,647,399 B2 | 11/2003 | Zaremba | |
| 6,691,140 B1 | 2/2004 | Bogrett | |
| 6,714,980 B1 | 3/2004 | Markson et al. | |
| 6,742,139 B1 | 5/2004 | Forsman et al. | |
| 6,833,073 B2 | 12/2004 | Agarwal | |
| 6,915,315 B2 | 7/2005 | Autrey et al. | |
| 6,981,177 B2 | 12/2005 | Beattie | |
| 7,093,086 B1 | 8/2006 | Rietschote | |
| 7,155,586 B1 | 12/2006 | Wagner et al. | |
| 7,165,156 B1 | 1/2007 | Cameron et al. | |
| 7,206,911 B2 | 4/2007 | Wolfgang et al. | |
| 7,237,021 B2 | 6/2007 | Penney et al. | |
| 7,251,749 B1 | 7/2007 | Fong et al. | |
| 7,254,682 B1 | 8/2007 | Arbon | |
| 7,743,178 B2 * | 6/2010 | Warren et al. | 710/30 |
| 2002/0008795 A1 | 1/2002 | Koyama et al. | |
| 2002/0124013 A1 | 9/2002 | Loy et al. | |
| 2003/0093579 A1 | 5/2003 | Zimmer et al. | |
| 2004/0031030 A1 | 2/2004 | Kidder et al. | |
| 2004/0093474 A1 | 5/2004 | Lin et al. | |
| 2004/0199515 A1 | 10/2004 | Penney et al. | |
| 2004/0205390 A1 | 10/2004 | Kanevsky et al. | |
| 2004/0221125 A1 * | 11/2004 | Ananthanarayanan et al. | 711/203 |
| 2004/0250021 A1 * | 12/2004 | Honda et al. | 711/114 |
| 2005/0005066 A1 * | 1/2005 | Nakayama et al. | 711/117 |
| 2005/0010835 A1 | 1/2005 | Childs et al. | |
| 2005/0033930 A1 | 2/2005 | Haruma et al. | |
| 2005/0044162 A1 | 2/2005 | Liang et al. | |
| 2005/0050386 A1 | 3/2005 | Reinhardt et al. | |
| 2005/0055603 A1 | 3/2005 | Soran et al. | |
| 2005/0108247 A1 * | 5/2005 | Heinla et al. | 707/10 |
| 2005/0138090 A1 | 6/2005 | Augenstein et al. | |
| 2005/0138204 A1 | 6/2005 | Iyer et al. | |
| 2005/0182953 A1 | 8/2005 | Stager et al. | |
| 2005/0188256 A1 | 8/2005 | Stager et al. | |
| 2005/0198303 A1 | 9/2005 | Knauerhase et al. | |
| 2005/0210218 A1 * | 9/2005 | Hoogterp | 711/203 |
| 2005/0223181 A1 | 10/2005 | Jeppsen et al. | |
| 2005/0240792 A1 | 10/2005 | Sicola et al. | |
| 2005/0251540 A1 | 11/2005 | Sim-Tang | |
| 2005/0257085 A1 | 11/2005 | Haustein et al. | |
| 2005/0262097 A1 | 11/2005 | Sim-Tang et al. | |
| 2005/0262377 A1 | 11/2005 | Sim-Tang | |
| 2005/0267920 A1 | 12/2005 | Helliker et al. | |
| 2006/0010227 A1 * | 1/2006 | Atluri | 709/217 |
| 2006/0031468 A1 | 2/2006 | Atluri et al. | |
| 2006/0047714 A1 | 3/2006 | Anderson et al. | |
| 2006/0114497 A1 | 6/2006 | Anderson et al. | |
| 2006/0149793 A1 | 7/2006 | Kushwah et al. | |
| 2006/0155912 A1 | 7/2006 | Singh et al. | |
| 2006/0218434 A1 | 9/2006 | Solhjell | |
| 2007/0038998 A1 | 2/2007 | Fries | |
| 2007/0168404 A1 | 7/2007 | Nakamura et al. | |
| 2007/0244938 A1 | 10/2007 | Michael et al. | |

OTHER PUBLICATIONS

U.S. Appl. No. 11/438,401, filed Dec. 6, 2007, Alturi et al.

U.S. Appl. No. 11/438,036, filed Nov. 22, 2007, Alturi.

U.S. Appl. No. 11/229,289, filed Jan. 12, 2006, Alturi.

Data Protection—Perform Zero Downtime Backups [online Jan. 29, 2009]. Retrieved from the Internet URL: http://stage.hp.resource.com/sbso/bus_protect/data_protect/zero_downtime.

HP Open View Storage Data Protector 5.1 Software [online] [retrieved on Jan. 29, 2009]. Retrieved from the Internet URL: http://www.hp.com/products1/storage/pdfs/media/OVDPds2.pdf.

Storagecraft Technology Corporation: Protecting Windows Servers and PCs with Fast and Reliable Online Backup and Bare Metal Recovery Solutions [online].

* cited by examiner

CAUSATION OF A DATA READ OPERATION AGAINST A FIRST STORAGE SYSTEM BY A SERVER ASSOCIATED WITH A SECOND STORAGE SYSTEM ACCORDING TO A HOST GENERATED INSTRUCTION

CLAIM OF PRIORITY

This application is a divisional application of and claims priority to patent application Ser. No. 11/229,289 (U.S. Patent Publication No. 2006/0010227, now U.S. Pat. No. 8,055,745), titled "Methods and apparatus for accessing data from a primary data storage system for secondary storage" filed on Sep. 16, 2005, which is a continuation-in-part application of U.S. patent application Ser. No. 10/859,368 (U.S. Patent Publication No. 2006/0031468, now U.S. Pat. No. 7,698,401), titled "Secondary data storage and recovery system" filed on Jun. 1, 2004.

FIELD OF TECHNOLOGY

The present invention is in the field of data storage and recovery systems and pertains particularly to causation of a data read operation against a first storage system by a server associated with a second storage system according to a host generated instruction.

BACKGROUND

Data stored in a primary storage system may be manually acquired and designated to be stored in a second storage system by a user. Requiring a user to determine what information to acquire may result in a frequency of transfers of information to secondary storage that falls below an acceptable frequency. In addition, a user may lack information regarding data stored in primary storage to determine what information should be stored in secondary storage. As a result, a user may store excessive data and/or insufficient data in secondary storage. Data desired at a later date may therefore be missing, and/or excessive resources may be consumed in order to preserve the desired data.

SUMMARY

Methods and systems of causation of a data read operation against a first storage system by a server associated with a second storage system according to a host generated instruction are disclosed. In one aspect, a method of causing a data read operation against a first storage system includes several steps, where the data read operation is performed by a server associated with a second storage system according to a machine-readable instruction generated by a host directly associated with the first storage system. The method includes saving data from the host to the first storage system, creating a record of one or more data write comprising the data saved to the first storage system, and processing, using a variable contained in the record, a mapping scheme resulting in knowledge of one or more physical offset in the first storage system to receive the one or more data write. The method further includes forwarding the record including the offset information to the server associated with the second storage system, and accessing the first storage system to read the data according to the instruction of the host and reading the data.

In step (a) the host may be a LAN connected server and the first storage system may be a SAN-based storage system. The SAN-based storage system may be accessible through at least one of a Fibre Channel network and an Ethernet network. In step (b) the record created may include one or more origin and destination machine address information, physical payload length information, logical write location information as seen by the host, and one or more mapping value pre-known and associated with the first storage system. In step (c) the processing may be achieved via algorithm using at least one mapping value as a variable. In step (d) the record may be forwarded over a TCP/IP-enabled connection.

In step (e) the first storage system may be accessed for read by at least one of through a Host Bus Adaptor and Fibre Channel network and through an Ethernet network. A client instance of the host may perform a mapping function against a primary storage view to derive a mapped offset location. The server may read changed data of a host from the first storage system to apply the information to the second storage system and to provide time-based recovery. The host may have a configurable host view of its storage volume and access to time-stamped versions of its backed up information, wherein the versions are compatible with the configurable host view.

The configurable host view may be comprised of at least one of a file, a data set, and a volume. The server may read from one or more of a first storage system buffer and a first storage system cache. The server may perform a mapping function using at least one of a standard protocol and a custom application program interface.

In another aspect, a software suite to cause a data read operation against a first storage system includes multiple portions, the data read operation performed by a server associated with a second storage system according to a machine-readable instruction generated by a host directly associated with the first storage system. The software suite includes a portion to save data from the host to the first storage system, a portion to create a record of at least one data write comprising the data saved to the first storage system, and a portion to process, using a variable contained in the record, a mapping scheme resulting in knowledge of at least one physical offsets in the first storage system to receive the at least one data write, a portion to forward the record including the offset information to the server associated with the second storage system, a portion to access the first storage system to read the data according to the instruction of the host and a portion to read the data.

In step (a) the host is a LAN connected server and the first storage system is a SAN-based storage system. The SAN-based storage system is accessible through at least one of a Fibre Channel network and an Ethernet network. In step (b) the record created includes one or more origin and destination machine address information, physical payload length information, logical write location information as seen by the host, and one or more mapping value pre-known and associated with the first storage system. In step (c) the processing is achieved via algorithm using at least one mapping value as a variable.

In yet another aspect, a system, includes a host to save data on a first storage system and to generate a machine-readable instruction to initiate a data read operation, the data read operation is performed by a server associated with a second storage system, the first storage system, data of the host is saved on the first storage system, the second storage system, the server, the server is associated with the second storage system, a record keeping module includes of one or more of the host and the server, wherein the record keeping module creates a record of one or more data write including the data saved to the first storage system, a mapping module comprised of at least one of the host and the server to use a variable in the record to process a mapping scheme resulting in knowledge of one or more physical offset in the first storage system to receive the one or more data write. The mapping module forwards the record to the server when it processes the mapping scheme and a read module comprised of the host and/or the server to access and read the first storage system to read the data according to the instruction of the host.

The host may be a LAN connected server and the first storage system may be a SAN-based storage system.

DETAILED DESCRIPTION

Methods and systems of causation of a data read operation against a first storage system by a server associated with a second storage system according to a host generated instruction are disclosed. The methods and systems of the present invention are described in enabling detail in various embodiments described below.

Figure 1:
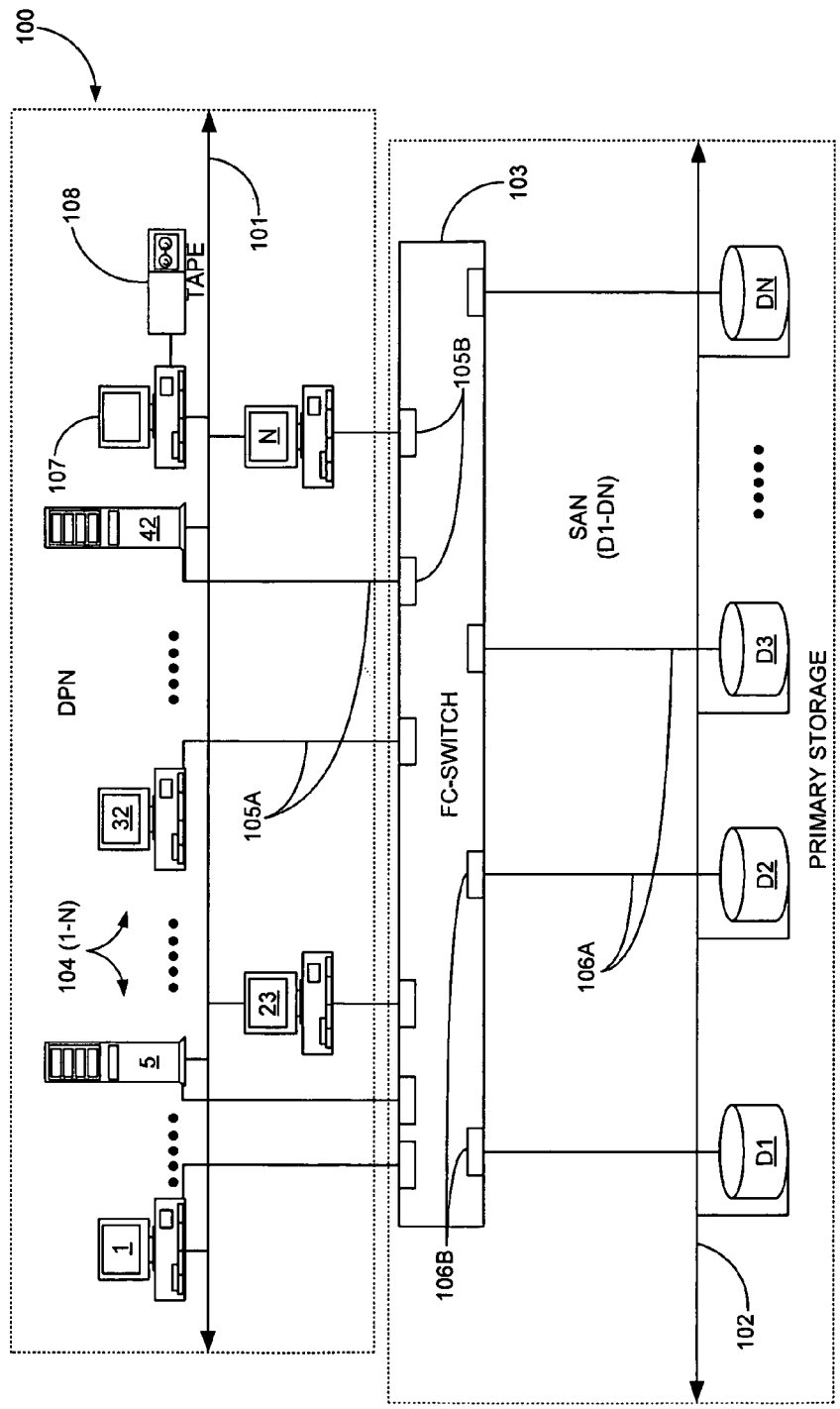
FIG. 1 is an architectural view of a typical SAN-based data storage and recovery network according to prior art.

FIG. 1 is an architectural view of a typical SAN-based data-storage and recovery network according to prior art. A data-packet-network (DPN) 100 is illustrated in this example and is typically configured as a local-area-network (LAN) supporting a plurality of connected nodes 104 (1-N). DPN 100 may be an IP/Ethernet LAN, an ATM LAN, or another network type such as wide-area-network (WAN) or a metropolitan-area-network (MAN).

For the purpose of this example assume DPN 100 is a LAN network hosted by a particular enterprise. LAN domain 100 is further defined by a network line 101 to which nodes 104 (1-N) are connected for communication. LAN domain 100 may be referred to herein after as LAN 101 when referring to connective architecture. There may be any arbitrary number of nodes 104(1-N) connected to LAN cable 101. Assume for the purposes of this example a robust LAN connecting up to 64 host nodes. Of these, nodes 1, 5, 23, 32, 42, and n are illustrated. A node that subscribes to data back-up services is typically a PC node or a server node. Icons 1, 23, 32, and n represent LAN-connected PCs. Icons 5 and 42 represent LAN-connected servers. Servers and PCs 104 (1-N) may or may not have their own direct access storage (DAS) devices, typically hard drives.

A PC node 107 is illustrated in this example and is reserved for archiving back-up data to a tape drive system 108 for long-term storage of data. An administrator familiar with batch-mode data archiving from disk to tape typically operates node 107 for tape backup purposes.

Network 100 has connection through a FC switch 103, in this case, to a SAN 102 of connected storage devices D1-DN (Disk 1, Disk N). Collectively, D1-DN are referred to herein as primary storage. SAN domain 102 is further defined by SAN network link 109 physically connecting the disks together in daisy-chain architecture. D1-DN may be part of a RAID system of hard disks for example. FC switch 103 may be considered part of the SAN network and is therefore illustrated within the domain of SAN 102. In some cases an Ethernet switch may replace FC switch 103 if, for example, network 109 is a high-speed Ethernet network. However, for the purpose of description here assume that switch 103 is an FC switch and that network 109 functions according to the FC system model and protocol, which is well known in the art.

Each node 104 (1-N) has a host bus adapter (not shown) to enable communication using FCP protocol layered over FC protocol to FC switch 103 in a dedicated fashion. For example, each connected host that will be backing up data has a separate optical data line 105A in this example connecting that node to a port 105B on switch 103. Some modes may have more than one HBA and may have multiple lines and ports relevant to switch 103. For the purpose of example, assume 64 hosts and therefore 64 separate optical links (Fiber Optic) connecting the hosts to switch 103. In another embodiment however the lines and splitters could be electrical instead of optical.

FC switch 103 has ports 106B and optical links 106A for communication with primary storage media (D1-DN). Fabric in switch 103 routes data generated from certain hosts 104 (1-N) in DPN 100 to certain disks D1-DN for primary data storage purposes as is known in RAID architecture. Data is stored in volumes across D1-DN according to the RAID type that is applied. Volumes may be host segregated or multiple hosts may write to a single volume. D1-DN are logically viewed as one large storage drive. If one host goes down on the network, another host may view and access the volume of data stored for the down host. As is known, under certain RAID types some of the disks store exact copies of data written to primary storage using a technique known as data striping. Such storage designations are configurable.

There will likely be many more ports on the north side of FC switch 103 (facing LAN hosts) than are present on the south side of FC switch 103 (facing primary storage). For example, each host node may have a single HBA (SCSI controller). Each physical storage device connected to SAN network 109 has a target device ID or SCSI ID number, each of which may be further divided by an ID number referred to in the art as a logical unit number (LUN). In some cases a LUN, or device ID number can be further broken down into a sub-device ID or sub logical unit number (SLUN) although this technique is rarely used.

In prior art application when a host node, for example node 104 (1), writes to primary storage; the actual write data is transmitted to one of ports 105B over the connected fiber optic line 105A. From port 105B the data is routed to one of ports 106B and then is transmitted to the appropriate disk, D1, for example. FC transport protocols, including handshake protocols are observed. All data written from host 1, for example, to primary storage D1 comprises data that is typically stored in the form of data blocks. Data generated by hosts is typically written to primary storage in a buffered fashion for performance reasons, however most systems support un-buffered writes to primary storage for reliability reasons.

At the end of a work period, data and the changes to it that have been stored in primary storage disks D1-DN may be transferred or copied to longer-term tape media provided by tape drive 108. Operating node 107, an administrator copies data from D1-DN and writes the data to tape drive 108. Each host sends over the data and or its changes for one or more volumes. The data changes have to be computed before they can be sent as they are not tracked continuously, therefore, backup operations are typically performed in batch mode, queuing volumes and or files for one or more hosts, and so on until all hosts 104 (1-N) have been completely backed up to tape media. Each node has a backup window or time it will take to completely preserve all of the data that previously existed and/or the changes that particular node generated in the work period. Typical time windows may range from 30 minutes for a PC to up two 2 days or more for a robust data server. An administrator must be paid to oversee the backup operations and in the case of large servers backup jobs may be ongoing taking all of the administrator's time.

One goal of the present invention is to eliminate the batch mode archiving requirements of data storage and recovery systems. A solution to the inefficient process can save considerable time and resource.

Figure 2:
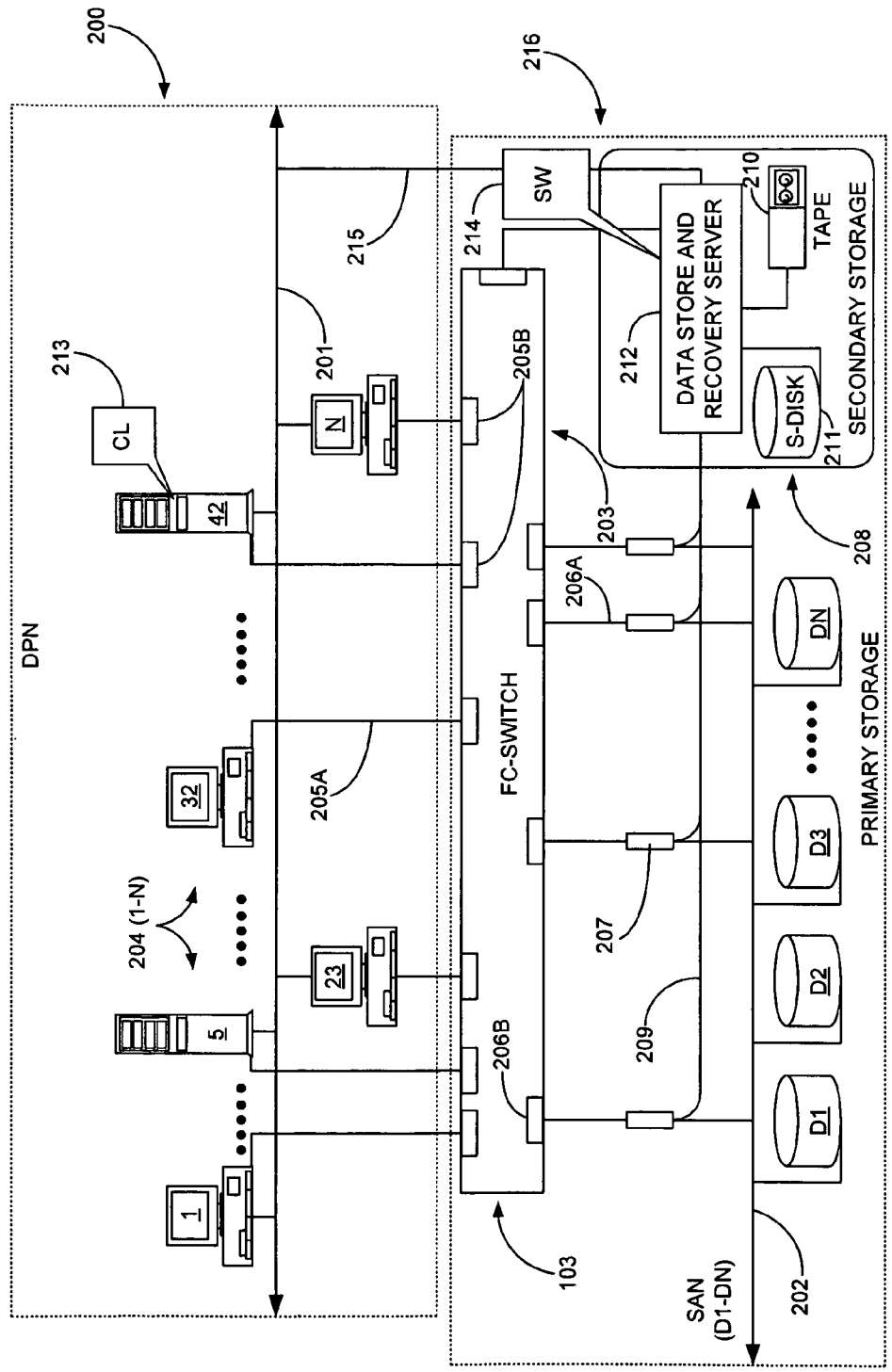
FIG. 2 is an architectural overview of a SAN-based data storage and recovery network according to an embodiment of the present invention.

FIG. 2 is an architectural overview of a SAN-based storage and recovery network according to an embodiment of the present invention. A DPN 200 is illustrated in this embodiment. DPN 200 may be an Ethernet LAN, TCP/IP WAN, or metropolitan area network (MAN), which may be a wireless network. For purpose of discussion assume that DPN 200 is a network similar in design and technology to that of LAN domain 100 described above with references to FIG. 1. An exception to the similarity is that there is no tape drive system or a connected administrator node for controlling tape archiving operations maintained on the north side of the architecture.

LAN domain 200 is further defined in this embodiment by LAN cable 201 providing a physical communication path between nodes 204 (1-N). LAN domain 200 may hereinafter be referred to as LAN 201 when referring to connective architecture. Nodes 204 (1-N) are illustrated as connected to SAN-based FC switch 103 via optical paths 205A and ports 205B mirroring the physical architecture described further above. The SAN network is identified in this example as SAN 216. In this example, nodes 1-N each have an instance of client software (CL) 213 defined as a client instance of a secondary data storage and recovery server application described later in this specification.

Nodes 204 (1-N) in this example are a mix of PC-based and robust servers that may work in dedicated standalone mode and/or in cooperative fashion to achieve the goals of the enterprise hosting the LAN. For example, server 5 may be an email server and server 42 may be an application server sharing duties with one or more other servers. A common denominator for all of nodes 204 (1-N) is that they all, or nearly all, generate data that has to be backed up for both near term and long-term recovery possibilities in the event of loss of data. Nodes 204 (1-N) may or may not be equipped with direct access storage (DAS) drives.

Nodes 204 (1-N) have dedicated connection paths to SAN FC switch 103 through optical cables 205A and FC ports 205B in a typical architecture. In one embodiment of the present invention high-speed copper wiring may be used in place of fiber optic links. However in a preferred embodiment, the faster technology (fiber) is implemented. The exact number of nodes 204 (1-N) is arbitrary, however up to 64 separate nodes may be assumed in the present example. Therefore, there may be as many as 64 cables 205A and 64 ports 205B on the north side of FC switch 103 in the SAN connection architecture. Ports 205B on the north side may be assumed to contain all of the functionality and components such as data buffers and the like for enabling any one of nodes 201 (1-N) to forge a dedicated connection for the purpose of writing or reading data from storage through FC switch 103.

Ports 205B are mapped through the FC fabric to south side ports 206B. Ports 206B are each configured to handle more than one host and number less than the LAN-side ports 205B. One reason for this in a typical architecture is that a limited number of identifiable storage devices are supported on SAN domain 216, which is further defined by network cable 202. SAN domain 216 may also be referred to herein as SAN 202 when referring to physical connection architecture. D1-DN may number from 2 to fifteen devices in this example; however application of LUNs can logically increase the number of "devices" D1-DN that may be addressed on the network and may be written to by hosts. This should not be considered a limitation in the invention.

SAN 202 is connected to ports 206B on FC switch 103 by way of high-speed optical cabling (206A) as was described further above with reference to FIG. 1 with one exception. A secondary storage sub-system 208 is provided in one embodiment to operate separately from but having data access to the SAN-based storage devices D1-DN. In a preferred embodiment System 208 includes a data-storage and recovery server 212 and at least one secondary storage medium (S-Disk) 211, which in this example, is a DAS system adapted as a SATA drive. In one embodiment disk 211 may be a PATA drive.

In this example, server 212 is a dedicated node external from, but directly connected to storage disk 211 via a high-speed data interface such as optical cable. In one embodiment of the present invention server 212 may be PC-based running server and storage software. Disk 211 is, in this example, an external storage device or system however, in another embodiment, it may be internal. In one embodiment of the present invention disk 211 may be logically created or partitioned from the primary storage system including D1-DN on SAN 202. There are many possibilities.

Server 212 has a SW instance 214 installed thereon and executed therein. SW 214 is responsible for data receipt, data validation, and data preparation for writing to secondary storage. SW 214 may, in one embodiment, be firmware installed in distributed fashion on line cards (not shown) adapted to receive data. In another embodiment, SW 214 is a mix of server-based software and line card-based firmware. More detail about the functions of instance 214 is given later in this specification.

Server 212 has a direct connection to FC switch 103 in this example and with some configuration changes to the FC switch 103 and or the primary storage system including D1-DN has access to all data stored for all hosts in D1-DN over SAN 202 and through the FC fabric. In this example, server 212 also has a direct LAN connection to LAN 201 for both-data access and data sharing purposes and for system maintenance purposes. Server 212 can read from primary storage and can sync with primary storage in terms of volume data location offsets when booted up. However server 212 stores data differently from the way it is stored in primary storage.

System 208 includes a tape drive system 210 for archiving data for long-term recovery and storage. System 208 is responsible for providing a secondary storage medium that can be used independently from the primary storage D1-DN for enhanced near-term (disk) and long-term (tape) data backup for hosts 204 (1-N) operating on network 201.

In this example, data written from hosts to primary storage (D1-Dn) is split off from the primary data paths 206A (optical in this example) defining the dedicated host-to-storage channels. This is achieved in this example using a data path splitter 207 installed, one each, in the primary paths on the south side of FC switch 103 in this example. In this way system 208 may acquire an exact copy of all data being written to primary storage. Data mirrored from the primary data paths is carried on high-speed fiber optics lines 209, which are logically illustrated herein as a single data path in this example for explanation purposes only. In actual practice, server 212 has a plurality of line cards (not shown) installed therein; each card ported and assigned to receive data from one or more splitters.

In one embodiment, data path splitting is performed on the north side of FC switch instead of on the south side. In this case more splitters would be required, one for each data path like 205A. The decision of where in the architecture to install splitters 207 is dependent in part on the number of hosts residing on LAN 201 and the amount of overhead (if installed on the south side) needed to efficiently keep track of source and destination addresses for each frame carrying payload data passing the splitters.

Data is transparently split from primary host paths for use by server 208 to provide enhanced secondary data storage and recovery that greatly reduces the work associated with prior-art operations. Server 212, with the aid of SW 214 provides data storage for hosts onto disk 211 and automated archiving to tape media 210 in a continuous streaming mode as opposed to periodic data back up and tape-transfer operations performed in prior art systems. In one embodiment WAN data replication may be practiced instead of or in addition to tape archiving. For example, hosts 204(1-N) may be WAN-connected or WAN-enabled through a gateway. Data from disk 211 may be replicated for recovery purposes and sent over the WAN to a proxy system or directly to hosts. The data may be sent in pass through mode (lower level) where there are no application consistency features applied. In one embodiment recovery data may be replicated and sent to hosts in a time shot mode wherein application consistency measures are applied to the data.

In practice of the present invention according to the exemplary embodiment illustrated, a host, say host 5 for example, performs a save operation to a database. The save operation is considered a data write to primary storage. When the data hits splitter 207 after routing has been assigned to the appropriate storage device D1-DN by FC switch 103, an exact copy is mirrored from the splitter (207) to server 212. Server 212 receives the data inline via dedicated line interface and performs in some embodiments unique data optimization techniques before writing the data sequentially to secondary disk 211.

In an alternate embodiment mirroring data from the primary paths of the hosts may be performed within FC switch 103; however modification of switch hardware would be required. Splitting data from either the north side or the south side of switch 103 can be performed using off-the shelf hardware requiring no modification to FC switch 103. In the physical link layer of the FC protocol model there is no discernable difference in splitting data at the north or south side of FC switch 103, however in subsequent protocol layers the characteristics thereof provide some motivations for performing data splitting, optimally, on south side of FC switch 103. Likewise, data may be split at the location of each host 204 (1-N) using similar means. In still another embodiment server 212 may wait and read any new data after it has been written to primary storage. However in this case, an overhead would be created comprising the number of extra reads performed by server 212. Splitting the data from primary data paths provides the least intrusive or passive method for obtaining the required data for secondary storage.

Host machines 204 (1-n) may have an instance of client SW (CL) 213 installed thereon and executable there from. CL 213 cooperates with SW 214 running on machine 212 to optimize data writing to secondary storage by helping to reduce or eliminate redundant data writes.

Data storage and recovery server 212 keeps a database (not shown) of metadata describing all data frames received that are considered writes (having payloads for write) and optionally reads, the metadata describes at least the source address (IP or MAC), destination address, (LUN), frame sequence number, offset location, length of payload, and time received of each data frame that is copied thereto from the primary data paths from hosts 204 (1-N) to primary storage (D1-DN). The metadata is used to validate write data. The technique is for ensuring against any data loss theoretically possible due to the split and lack of flow control that it implies. It also is used for reducing or eliminating secondary storage of redundant writes and requires cooperation, in one embodiment from hosts 204 (1-N) running instances of CL 213. In this way redundant writes, for example, of the same data whether created by a same or by separate hosts are not processed by server 212 before data is written to disk 211. Same writes by separate hosts are instead presented as one write identifying both hosts.

CL 213 in the above-described embodiment has a utility for creating the metadata descriptions for each pending write performed by the host server or PC. At each write, server 212 receives both the actual data and the associated metadata. The metadata for a set of received write frames is compared with metadata formerly acquired by server 212. A hit that reveals a same data checksums, length, order and other parameters for a payload indicates a redundant write or one where the data has not changed. More detail about this unique optimization technique is provided later in this specification.

Other techniques used by server 212 include the use of a sparse file utility as one layer of one or more compression techniques to optimize the speed of secondary storage to match that of primary storage devices and to facilitate faster data recovery to hosts in the event that it is required. Sparse file technology is based on avoiding storing of unused data blocks. Storage is more efficient because no physical storage space is allocated for portions of the file that do not contain data.

In a preferred embodiment of the present invention, server 212 facilitates writing to secondary data storage in near real time in significantly larger sequential streams than would be possible if the input data itself were written per its normal characteristics. Also in a preferred embodiment of the invention stored data aging past a reasonable time window, perhaps 30-120 days, is archived to tape or other long-term storage media in an automated fashion per flexible policy settings. In still another enhancement to the way data is stored, server 212 is adapted in a preferred embodiment to write data to disk 211 is a sequential fashion instead of a random fashion as is the typical method of prior-art data store mechanics. In still another preferred embodiment any data that is older than a reasonable and configurable time window will be securely and automatically purged.

The system of the present invention enables a client to allocate more disk space for primary storage and eliminates periodic data backup and archiving operations. In addition, data recovery back to any requesting host can be performed in a file-based, volume-based, or application-based manner that is transparent across operating systems and platforms. Still another benefit is that secondary storage space can be less than that used for primary storage or for normal secondary disks maintained in primary storage because of data compression techniques used.

One with skill in the art of network-based data storage will recognize that secondary storage system 208 may be provided as a CPE hardware/software system or as a CPE software solution wherein the client provides the physical storage and host machine for running the server application software. In one embodiment, system 208 may be provided as a remote service accessible over networks such as other LANs, MANs WANs or SAN Islands.

In the latter case, instead of using physical path splitters, the system may access data directly from the primary storage system before writing to secondary storage. Some overhead would be required for the extra read operations performed by the system. In a preferred embodiment, the system is implemented as a CPE solution for clients. However that does not limit application to clients using a WAN-based SAN architecture of storage network islands. System 208 is scalable and can be extended to cover more than one separate SAN-based network by adding I/O capability and storage capability.

Figure 3:
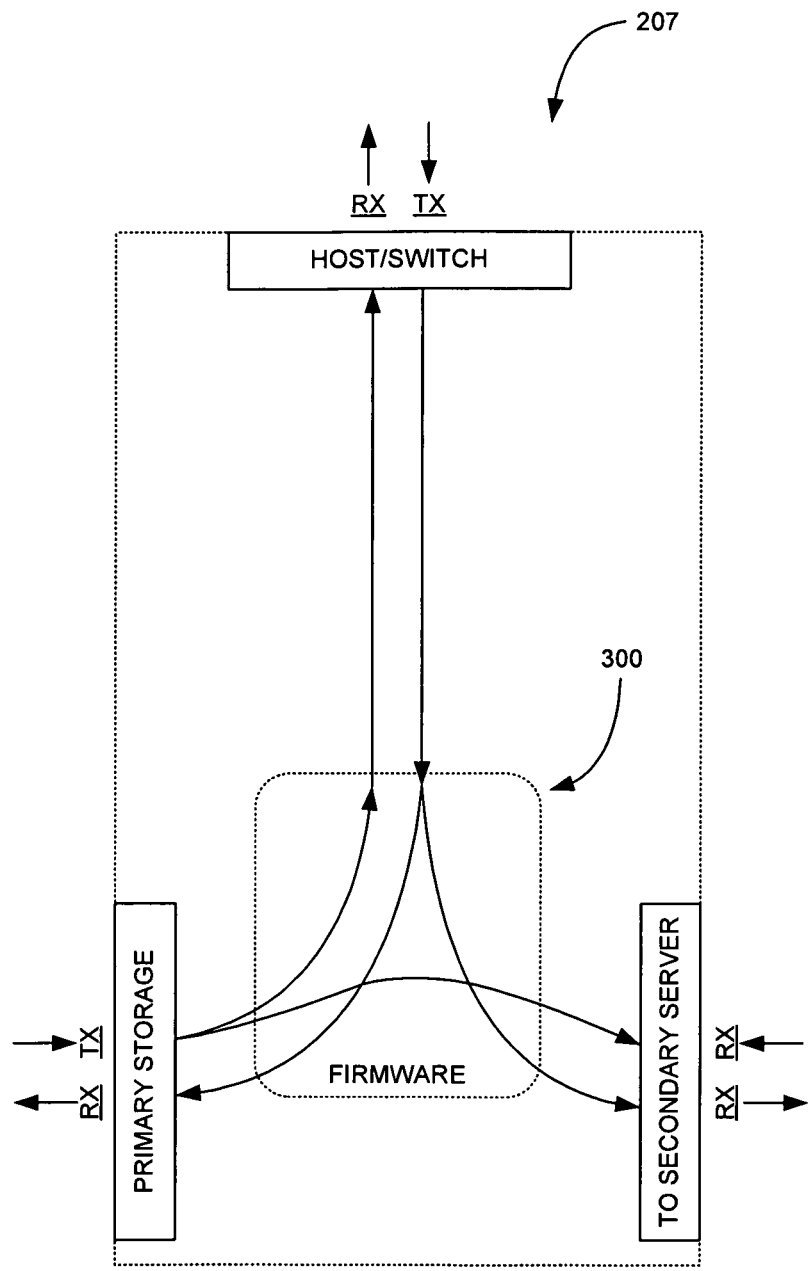
FIG. 3 is a block diagram illustrating data path splitting in the architecture of FIG. 2.

FIG. 3 is a block diagram illustrating data splitting as practiced in the architecture of FIG. 2. Data splitter 207 is in this example is an off-the shelf hardware splitter installed into each primary data path from a host/switch to the primary storage system. As such, splitter 207 has an RX/TX port labeled From Host/Switch, an RX/TX port labeled To Primary Storage, defining the normal data path, and an RX/RX port labeled To Secondary Server, leading to server 212 described with reference to FIG. 2 above. In a preferred embodiment each optical cable has two separate and dedicated lines, one for receiving data sent by the host/switch and one for receiving data sent by the primary storage subsystem. The preponderance of data flows from the switch in this example to primary storage and thereby to secondary storage.

Normal FC stack protocol is observed in this example including the request/response protocol for initiating and concluding a transaction between a host and a primary storage destination. Firmware 300 is illustrated in this example and includes all of the functionality enabling exact copies of each data frame received at the switch-side port and destined to the primary storage port to be split onto the secondary server-side port.

In this configuration both the primary storage and secondary storage systems can theoretically communicate independently with any host configured to the FC switch. Referring back to the example of FIG. 2, data mirroring to secondary storage may, in one embodiment, only be performed on the stream that is incoming from a host and destined to primary storage. However in another embodiment server 212 "sees" all communication in both directions of the primary data path hosting a splitter 207. In this way, server 212 can insure that an acknowledgement (ready to receive) signal of the FC handshake has been sent from primary storage to a requesting host so that server 212 "knows" the write has been successful. In this embodiment, no data writes are mirrored to secondary storage if they are not also written to primary storage.

In still another embodiment all data from a host to primary storage may not be split to secondary storage. In this embodiment firmware at the splitter is enhanced to mirror only data frames that include a payload or "write data" and, perhaps an associated ACK frame. In this way unnecessary data frames containing no actual write data do not have to be received at server 212.

Logical cable 209 represents a plurality of separate fiber optics lines that are ported to Line Cards (not shown) provided within server 212. More detail about line communication capability is provided later in this specification.

Figure 4:
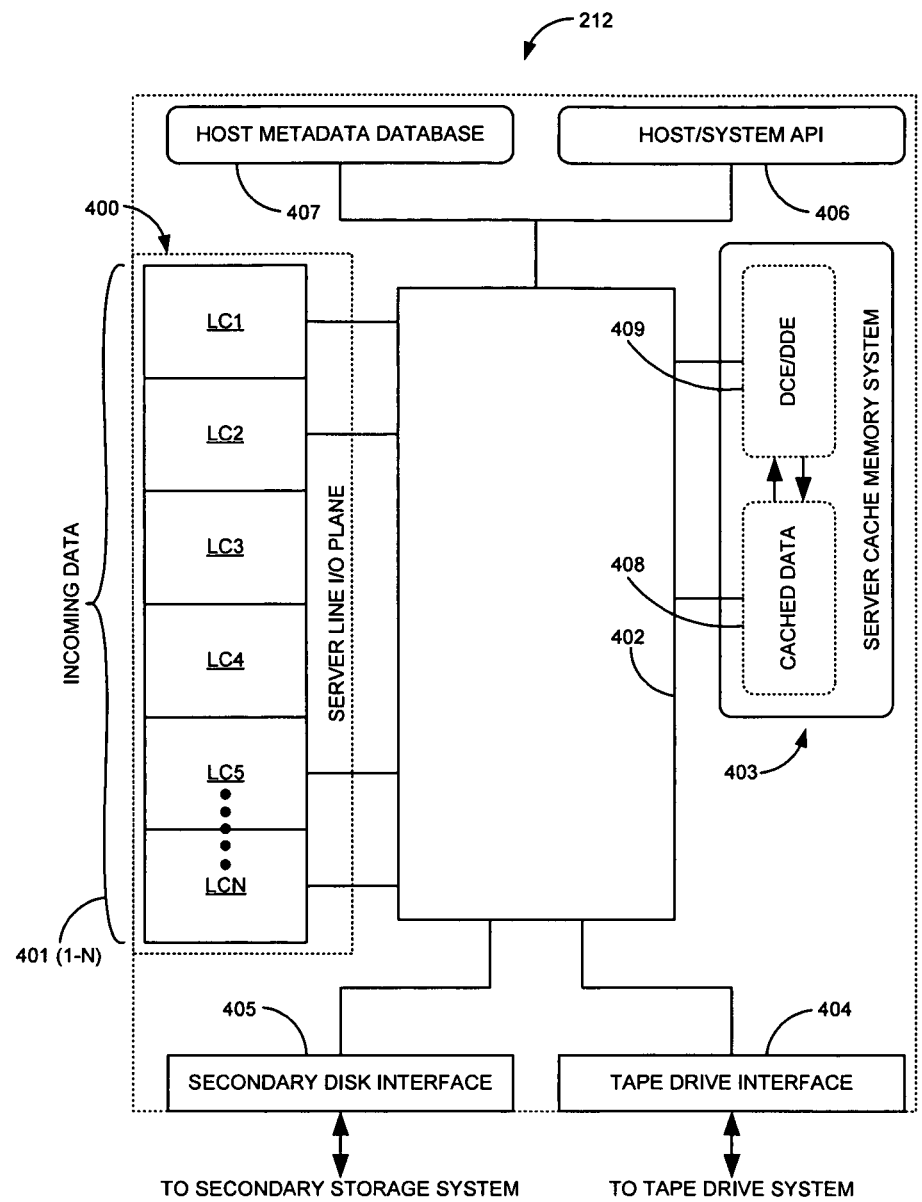
FIG. 4 is a block diagram illustrating components of the secondary storage and recovery server of FIG. 2 according to an embodiment of the present invention.

FIG. 4 is a block diagram illustrating components of secondary storage and recovery server 212 of FIG. 2 according to one embodiment of the present invention. Server 212 is, in this example, a dedicated data server node including just the hardware and software components necessary to carry out the functions of the present invention. Server 212 has a bank of line cards 400 including line cards (LC) 401 (1-N). Each line card 401 (1-N) has at least two RX ports and two possibly inactive TX ports configured to receive data from the assigned splitter or splitters 207 described with reference to FIG. 2 above. In one embodiment, one or more line cards 401 (1-N) may be dedicated for communication with FC switch 103 for the purpose of control signaling and error signaling and, perhaps direct communication with any host that is configured to FC switch 103.

In one embodiment of the present invention line cards 401 (1-N) may include a mix of standard HBAs that engage in two way data transfer and special dedicated cards provided by the inventor and adapted primarily only to receive incoming write data and to offload that data into a cache system represented herein by cache system 403. Each line card 401 (1-N) that is adapted to receive copied data from hosts has assigned to it the appropriate FC port (206B) including identified hosts (204) (1-N) that are assigned to the covered port for communication. The overall data load could be, in one embodiment, balanced among the available line cards 401 (1-N).

Server 212 has a high-speed server bus logically represented herein as bus structure 402. Bus 402 connects all necessary components together for communication within the server and to external components. A communication bus controller is not illustrated in the example, but may be assumed to be present. Each line card 401 (1-N) has a direct link to a server cache memory system 403 over logical bus 402. All data received on line cards 401 (1-N) that is considered read/write data is cached in one embodiment in cache memory system 403, the data represented herein by a block 408 labeled cached data. Data buffers and other components of cache system 403 and line cards 401 (1-N) are not illustrated but may be assumed to be present. More detail about a unique line card adapted for receiving data for secondary storage is provided later in this specification.

Server 212 has an I/O interface 405 to an external secondary storage disk or disk array analogous to storage disk 211 described with reference to FIG. 2 above. I/O interface 405 includes all of the necessary circuitry for enabling data writing to secondary storage from cache system 403 on a continuous streaming basis as data becomes available. In one embodiment data cache optimization is performed wherein redundant frames including read requests and, in one embodiment, redundant writes are deleted leaving only valid write data. In a preferred embodiment, elimination of redundant writes is a line card function physically carried out on designated cards 401 (1-N). In one embodiment the line cards 401 (1-N) can write directly to the secondary storage through the I/O interface 405 using a shared file system module provided for the purpose.

Server 212 has an I/O interface 404 to an external tape drive system analogous to tape drive system 210 described with reference to FIG. 2 above. Interface 404 includes all of the necessary circuitry for enable continuous writes to tape according to data availability for archiving long-term storage data. In one embodiment the I/O interfaces 404 and 405 can be one and the same.

Server 212 includes a host/system application program interface (API) 406 adapted to enable communication to any LAN-connected host bypassing the FC architecture over a separate LAN communication link analogous to link 215 described with reference to FIG. 2. Interface 406 may, in one embodiment, be used in data recovery operations so that recovery data does not have to be conducted through a primary host-to-storage data path exclusively.

Server 212 also has internal storage memory 407, which in this case is adapted to store metadata about data frames that are written to secondary storage and used by certain LCs 401 (1-N) to validate that a particular write carries data that has changed from a last data write to related data. The metadata includes but is not limited to host ID, a destination ID (LUN ID), an offset location in primary storage allocated for the pending write, and the length value of the payload.

Host nodes 204 (1-N), in one embodiment create the metadata sets with the aid of CL instance 213 described with reference to FIG. 2 when frames having write payloads are packaged for send through FC switch 103 to primary storage. The metadata can be sent either through the SAN or the LAN and is received at server 212 after the associated data frames. Each metadata set received is compared at least by payload length, and offset location to metadata sets previously received from a same host during a work period. Server 212 may, in one embodiment create hash values of metadata fields for use in a data search of a centrally located database containing all of the host metadata. In this embodiment the CL instance 213 may also create a hash value from the metadata set and exchange it with Server 212 as a faster way of matching metadata sets.

A hit, as described further above, indicates that the pending write as a duplicate payload already stored for the originating host or for another host or hosts. In this embodiment, redundant write frames can be eliminated onboard a LC without consulting database 407. For example, a limited amount of metadata may be retained for a specified period after it is received to any line card 401. This near-term metadata on a single line card describes only the data writes previously performed by hosts that are configured to the data path of that card. Metadata on other cards describes data sent by the hosts configured to those cards.

In another embodiment, metadata about data writes is generated at a line card analogous to the one described further above as the data is received from splitter 206A instead of at the host. In this embodiment, the generated metadata is immediately compared with previously generated and stored metadata either on board or in conjunction with an off-board database.

Although not preferred, it is possible to send generated metadata lists to LAN hosts so that metadata generated at a LAN host can be compared locally before writes are completed. In this aspect redundant saves may be prevented from entering the primary data path.

In a preferred embodiment only change data written and sent for write from hosts 204 (1-N) to primary storage is stored in secondary storage. In this embodiment data changes are also held separately as revisions from previous changes to a same volume of data. The purpose of this is to provide revision selectable and time-based recovery of data. In prior art systems old data is typically overwritten by new data including the change data and recovery is limited to recovery of the latest saved version of any data file.

Data changes are stored in disk 212 separately but linked to the relevant data block or blocks that the new revisions or versions apply to. Each time a new revision of data is recorded, it is also time stamped so that a host wishing to recover a specific version of a file, for example can select a desired time-based version or versions of a single file. In this way no data is lost to a host machine because it was over written by a later version of the same data.

Cache system 403 has a data compression/decompression engine (DCE/DDE) 409 provided therein for the purpose of compressing data before writing the data to secondary storage disk (211). In a preferred embodiment write data is prepared with a sparse file utility and then compressed before writing the data sequentially to storage disk 211. This technique enables more disk area to be utilized and with sequential storage, enables faster retrieval of data for recovery purposes. In one embodiment the DCE/DDE can be embedded with the line cards 401 (1-N).

In one embodiment, when data is served to one or more hosts during near term recovery (up to 30 days) it may be retrieved and served in compressed format. CL 213 running on host machines may, in this case, be adapted with a decompression engine for the purpose of decompression and access to the recovered data locally. This embodiment may be practiced for example, if volume recovery is requested over an IP connection or across a LAN network. In one embodiment, data is rendered into a higher-level application object or file format before being streamed to tape drive (211) for long-term archiving. In a preferred embodiment, data offload to tape is an automated process that runs on a schedule that may consider the amount of remaining unused secondary storage, or the age of oldest data change. In another embodiment tape archiving is triggered when a physical storage limit or a time based policy condition has been reached.

Figure 5A:
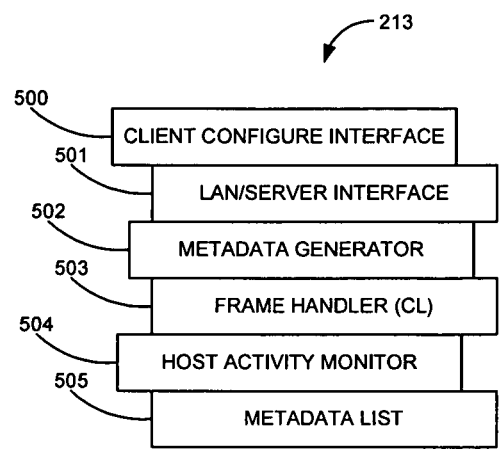
FIG. 5A is a block diagram illustrating client SW components of the SW of FIG. 2 according to an embodiment of the present invention.

FIG. 5A is a block diagram illustrating client SW components of client 213 of FIG. 2 according to an embodiment of the present invention. CL 213 has a client configure interface 500 enabling a LAN or remote network connection to and communication with server 212 described with reference to FIG. 4 for purpose of configuring a new LAN host to the system. This interface may be of the form of a Web browser interface that may also include a remote LAN to server interface 501 for manual configuration. Any LAN host may be configured or through an intermediate server as to what type and scope of data backup the host will practice. This consideration may very according to task assignment from backup of all generated data to only certain types of critical data.

In one less preferred embodiment CL 213 has a shared metadata list 505 for the purpose of checking if pending writes that may be redundant writes. In another embodiment a metadata-generating utility 502 is used to create metadata descriptions of each pending write that has been approved for the host. In this case, the metadata are associated to the frames containing the payload data and sent with each physical data frame by a frame or file handler 503. In another embodiment metadata generated is sent to the system host server (212) via LAN, bypassing the FC switch (193).

SW 500 may include, in one embodiment, a host activity monitor 504 that is provided and adapted to monitor host activity including boot activity and task activity. It may be that a host is running more than one application simultaneously and saving data generated by the separate applications as work takes place within the host. Monitor 504 is responsible for spawning the appropriate number of metadata generation utility instances 502 for the appropriate tasks occurring simultaneously within the host if the host is configured to generate metadata.

In another embodiment, CL SW 500 is kept purposely light in terms of components, perhaps only containing a configure interface, a LAN to server link, and an activity monitor. In this case the application and OS of the LAN host works normally to save data changes and the metadata is generated and compared on the server side of the system. There are many possibilities.

Figure 5B:
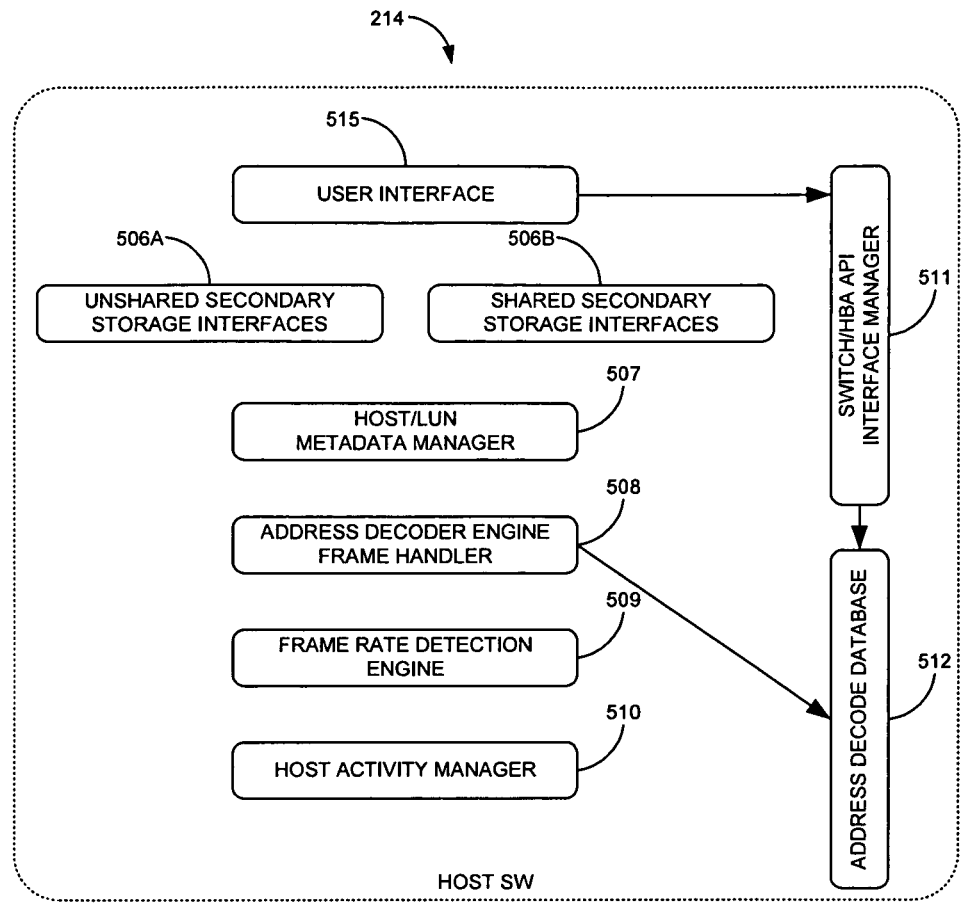
FIG. 5B is a block diagram illustrating components of the host SW of FIG. 2 according to an embodiment of the present invention.

FIG. 5B is a block diagram illustrating components of host SW 214 of FIG. 2 according to an embodiment of the present invention. SW 214 may be a mix of server software and line card firmware without departing from the spirit and scope of the present invention. SW 214 has a user interface 515 adapted for enabling remote configuration of LAN or WAN host machines that will have data backed up to near and long-term storage.

Interface 515 can be accessed via LAN or WAN connection and in some embodiments through a master server or intermediate server acting as a master server for distributed system sites. SW 214 has a switch HBA API interface 511 for enabling communication between the system (server 212) and an FC switch analogous to switch 103. In one embodiment interface 511 may be adapted for interface to an Ethernet switch.

SW 214 has a pair of secondary storage interfaces 506a and 506b, which are optionally adapted to enable either shared write capability or unshared write capability to secondary storage from the server. Interface 506A is optional in an embodiment wherein one or more specially adapted line cards in the server are enabled to compress and write data directly to secondary storage from an onboard cache system thereby bypassing use of a server bus. In this case unshared implies that each line card adapted to write data to secondary storage may do so simultaneously and independently from one another.

In one embodiment all data writes to secondary storage are performed by the host server from a server cache memory. In this case interface 506B (shared) is used. All line cards adapted to send data to secondary storage in this case send their data onto a PCI or other suitable type of server bus (shared) into a server cache memory from whence the data is compressed and then written into secondary storage (disk 211).

SW 214 has a host/LUN metadata manager utility 507 adapted either as a piece of software running on the server, or as distributed instances of firm ware running on line cards responsible for writing or sending their data for write into secondary storage. Manager utility 507 functions in one embodiment to compare metadata about physical data received in line with previous metadata sent from a same host to check for redundant writes against the same host and against writes performed by other hosts as well. In this way only valid changes are secured to the secondary storage media.

In another embodiment manager utility 507 is also adapted to generate metadata for comparison from data received from the data splitting junction for each line card. In this embodiment, the generated metadata is immediate compared with host metadata either onboard the line card or in conjunction with a server database containing a specific amount of metadata from all configured hosts. In one embodiment metadata is received at the server from hosts via LAN or WAN link and is not received by a line card from the FC switch. In this case the line card is adapted only to receive data from the split in the designated primary data path between a host and primary storage. Metadata lists generated at host machines can be exchanged periodically with server 212 off-board from line cards.

SW 214 has a frame handler with an address decoder engine 508 adapted, in a preferred embodiment as firmware installed on line cards adapted to receive data changes from host machines through the suitable split data path. Utility 508 works in conjunction with a configurable address decode database 512, which is adapted to retain host machine address information such as IP or MAC address depending on the network protocol used. Decode database 512 is populated through user interface 515 and interface manager 511. Configuration then provides both the home network information of a host and the FC or Ethernet port assignments and splitter address (if required).

Decoder engine 509 is responsible for decoding incoming data frames so that payloads for write may be properly identified. LUN destination, source destination, payload length, timestamp information, splitter ID (if required), and other information is provided from decoding incoming frames.

In one embodiment of the present invention, SW 214 has a frame rate detection engine 509 adapted as a distributed firmware component installed on each line card adapted for backup duties. The purpose of detecting frame rate is to enable proper adjustment of buffer load and speed according to the actual data speed over the link. A host activity manager 510 is provided and adapted to log host activity reported by a client component residing on the host or by actual data activity occurring on a line card assigned to the host.

Software 214 may contain additional components not mentioned in this example without departing from the spirit and scope of the present invention. Likewise some components illustrated may not be required such as the host activity manager 510, or one of the secondary storage interface types. SW 214, in a preferred embodiment, resides at least partially in the form of distributed firmware on special line cards provided by the inventor and dedicated to receive and process data incoming from the primary data path via optical splitter.

Figure 6:
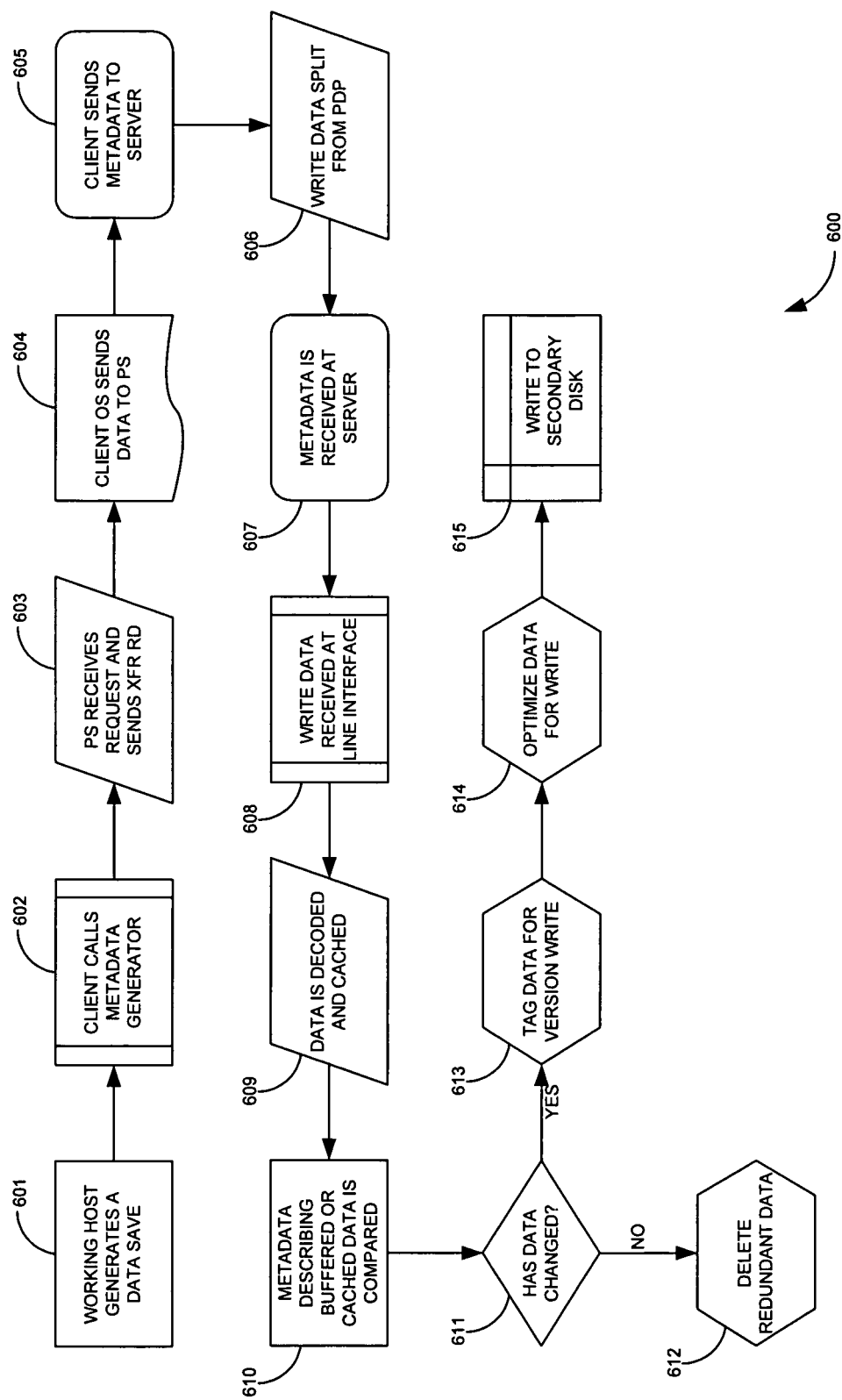
FIG. 6 is a flow chart illustrating a process for writing data to secondary storage according to an embodiment of the present invention.

FIG. 6 is a flow chart 600 illustrating a process for sending change data and writing the change data to secondary storage according to an embodiment of the present invention. At step 601 a LAN host analogous to one of hosts 204 (1-N) described above generates a data save operation (s). It will be appreciated by one with skill in data transfer that data sent from any host is sent as soon as it is physically "saved to disk" at the host. In one embodiment, replication is preformed if the host uses a local drive but is configured to send data changes through the FC switch to PS. At step 602, in one application, metadata describing parameters of the change data are generated by the client SW (213). CL 213 is configured to consider that each save operation performed by a host is a potential data write to primary storage although at this point it is not clear that it is a write containing change data. Therefore, each save made by an application working with files or other data whose data is to be backed up, is considered a write request, which must be initiated from the point of a host and must be acknowledged by the primary storage system before any writes are actually sent.

At step 603, the primary storage system receives a request from the client OS and sends an XFER RD (equivalent to acceptance of the request) back to the OS to get ready for the data transmission over the primary data path. It is noted herein that the request and confirmation of the pending transmission are visible on the assigned line card designated to receive data split from the primary data path (PDP).

In one embodiment of the present invention wherein the secondary storage system (208) is remote from the operating LAN or WAN over IP, data replication is used over IP tunneling protocols or other suitable transport protocols to send the exact data copies of data generated by one or more hosts to the secondary storage system server.

At step 604, the host, or client OS then sends the data over the PDP. The transmission is responded to by acknowledge and completion status packets. In one embodiment, these packets are used by server 212 to guarantee fidelity of writes to the secondary storage system by making sure that the writes to primary storage (PS) actually happened before storage space is allotted and writes are committed to the secondary storage.

In one embodiment, at step 605 CL (213) residing on the sending host generates metadata describing frames carrying a payload for write during a session with primary storage. The metadata describes aspects of the actual data frames it is associated with. For example, the host ID on the LAN and the destination device ID or LUN number is described. The offset position allocated by primary storage (received in ACK) is described. The frame sequence numbers are described, and the actual length of the data payload of the frame or frames is described.

At step 605, the metadata, if generated by the client, is preferably sent over LAN, WAN, or other link to server 212 and not over the PDP between the client machine and the PS system. The metadata of step 605 may describe all of the data "saved" and not just the changed data (if any). Moreover, the metadata may be continuously or periodically shared with server 212 from the client OS. The metadata is compared to previous metadata generated by the client to isolate "changed data" received at the server line interface.

In another embodiment metadata is not generated in step 602 or sent to server 212 in step 605, rather, metadata is generated at server side, more particularly at the specific line interface receiving the data split from the PDP. In this case change data is isolated at server side by comparing recent metadata against a metadata database. Metadata "hits" describing a same LUN, payload length, source address, offset location, etc., are considered redundant writes or duplicate writes that contain no new information. In this way processing is reduced.

At step 606, the data sent over the PDP by the client machine is transparently split from the path onto a path leading to server 212 and a receiving line card. It is noted herein that data frames having no payload and therefore not considered a potential write may be ignored from the perspective of secondary storage caching.

At step 607, the latest metadata describing the saved data is received at server 212 either in server cache, or in one embodiment, to a special memory allocated for the purpose. In another embodiment the metadata may be routed through the server to the appropriate line card that received the latest "save" data from the same client machine.

At step 608, data split from the PDP is received at the appropriate line interface. It is possible that a single line interface will process frames from multiple client machines. Proper frame decoding is used to identify and segregate data frames.

At step 609 data received at step 608 is decoded and cached. Data caching may involve offloading into a server cache. In one embodiment data caching may be performed onboard the line interface wherein the line interface has a capability for writing directly to secondary storage as described further above. In the latter case metadata comparison may also be performed onboard without using server resources. The metadata database could be carried onboard to a limited extent.

In either embodiment (line card based; server cache based), at step 610 the metadata describing the latest "save data" for the client is compared against previous metadata stored for the client. The comparison "looks" for hits regarding source ID, LUN ID, payload length; checksums value, and offset location allocated for PS to identify redundant frames or frames that do not contain any changed data in their payload portions.

At step 611 the system determines for the preponderance of frames cached for write whether data has actually changed from a last "save" operation performed by the client. For each frame payload, if data has not changed then the data is purged from cache and is not written to secondary storage in step 612. At step 611 if it is determined for any frames that the payload has changed (is different), then at step 613, those data units are tagged for write to secondary storage.

At step 614, those data units of the "save session" that are considered valid writes reflecting actual changed data are further optimized for storage by using a sparse file utility to create sparse files for saving storage space and faster near-term data recovery along with a compression algorithm to further compress the data. At step 615 the data is sequentially written to the secondary storage media analogous to disk 211 described with reference to FIG. 2 above.

At step 615, the existing data that would normally be overwritten with the new data is not overwritten. Rather, the change data is recorded as a time-based revision of the original file (viewing from an application level perspective). Similarly as new data changes arrive for the same data file, they too are recorded separately from the previous change. In this way file-based and time-based recovery services may be offered wherein the client can browse the number of revised versions of a same file, for example, and recover only the version or versions desired.

Data on the secondary storage system is viewable as volume block data, file system data, and application level data. It is also recoverable in the same views. Primary storage offset locations will be different than secondary storage offset locations. However, communication capability between the disk storage systems enables synchronizing of positions so that one may be directed to the exact write or read position in either system from the domain of either system.

One with skill in the art will appreciate that the secondary storage system of the present invention may be applied locally as a self-contained CPE solution or as a remotely accessible service without departing from the spirit and scope of the present invention. Performance of the primary data channels between host nodes and primary storage are not taxed in any way by the secondary storage system. Much work associated with manually directed backup operations as performed in prior art environments is eliminated.

Figure 7:
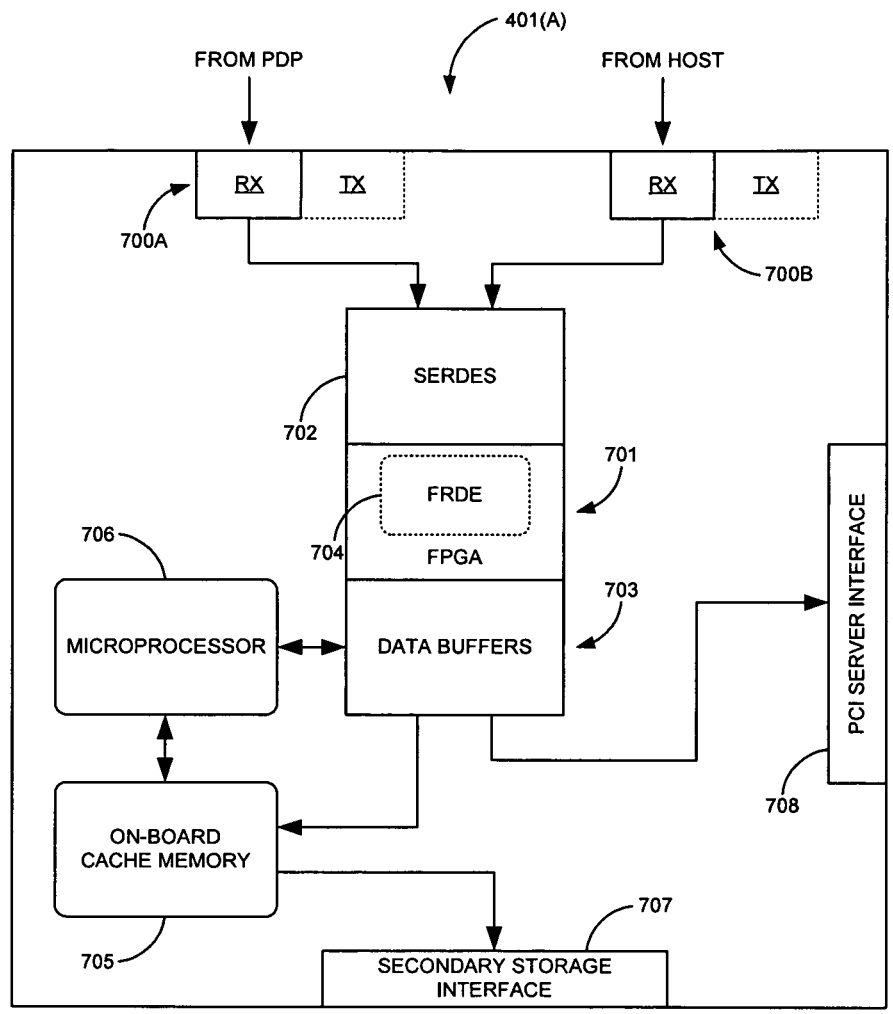
FIG. 7 is a block diagram illustrating components of one of line cards of FIG. 4 according to an embodiment of the present invention.

FIG. 7 is a block diagram illustrating components of one of line cards 401 (1-N) of FIG. 4 according to an embodiment of the present invention. Line card (LC) 401(1) can be any one of cards 401 that are dedicated for receive only of split data from PDPs. The designation 401(1) is arbitrary.

Card 401(1) may hereinafter be referred to simply as card 401. Card 401 has an RX port 700a capable of receiving data transparently split from a PS system analogous to the PS system (D1-DN) of FIG. 2 above. It is noted that card 401 cannot send data to the PS through the splitter onto the PDP. Card 401 also has an RX port 700B capable of receiving data transparently spit from a client machine or LAN host analogous to one or more of hosts 204 (1-N) of FIG. 2. Similarly, card 401 cannot send data to any host through the splitter onto the PDP. The incoming lines are one way only so that data splitting is completely passive.

In one embodiment card 401 is fabricated from the ground up to include only RX ports specially adapted to receive split data. In another embodiment a generic card blank is used but the TX port circuitry is disabled from sending any data.

A Field Programmable Gate Array (FPGA) 701 is provided to card 401 and is adapted among other purposes for maintaining proper data rate through card 401 into cache and to secondary storage. FPGA 701 is associated with a serializer/de-serializer (SERDIES) device 702, which are known in the art and adapted for serializing and de-serializing data streams in data streaming devices. Device 702 de-serializes the data stream incoming from RX ports 700A and 700B for analysis and buffer loading.

Card 401 has a data buffer or buffers provided thereto and adapted to hold data incoming from a splitter for processing. Data is streamed into card 401 and streamed out to secondary storage in near real time. That is to say that all data changes from hosts for write to secondary storage are processed from an incoming stream and offloaded in an outgoing stream for write to secondary storage.

In a streaming embodiment it is important to know the current data rate of incoming data so that processing data buffering and data outflow runs smoothly without overloading or under utilizing the data buffers and without having to discard any important data frames. Card 401 can only receive data from the splitter so it has no physical link control. Therefore, a method has to be implemented for deducing the actual data rate of the incoming stream and for fine-tuning the processing and buffer performance accordingly.

FPGA 701 has a frame rate detection engine (FRDE) 704 installed therein through firmware programming. FRDE 704 uses PLL and other technologies to fine-tune SERDIES performance, buffer performance and other internal data processing streams to a stable and constant data rate deduced through PLL methods.

Card 401 has a microprocessor 706 provided thereto and having processing access to data residing in buffers 703. Processor 706 performs metadata comparison in one embodiment where it is practiced onboard rather than off-board using the server CPU. Processor 706 may also perform frame decoding, address decoding, data compression and data writing functions in one embodiment utilizing an onboard cache memory 705.

Card 401 has a secondary storage interface 707 analogous to the unshared interface 506a of FIG. 5B and a PCI server interface 708 analogous to the shared interface 506b of the same. Each interface is optional as long as one is used. Cache memory 705 is also optional in one embodiment. In another embodiment all described components and interfaces are present n card 401 and may be programmed for optional use states either offloading data from buffers through the server interface onto a server bus and into a server cache for further processing, or by emptying buffers into cache 705 for further processing and direct writing through interface 707 to secondary storage bypassing server resources altogether.

The present invention is not limited to SCSI, FC, or SAN architectures. DAS and NAS embodiments are possible wherein FC switches or Ethernet Hubs between separate networks are not required. Likewise, several SANs connected by a larger WAN may be provided secondary storage and recovery services from a central network-connected location, or from a plurality of systems distributed over the WAN. VIP security and tunneling protocols can be used to enhance performance of WAN-based distributed systems.

SAN-Based Direct Read Access

According to another embodiment of the present invention, a method and apparatus for direct-read access from a remote location to one or more primary storage systems connected to a storage area network for data backup purposes is provided. The methods and apparatus of the present invention are described in enabling detail in various embodiments described below.

Figure 8:
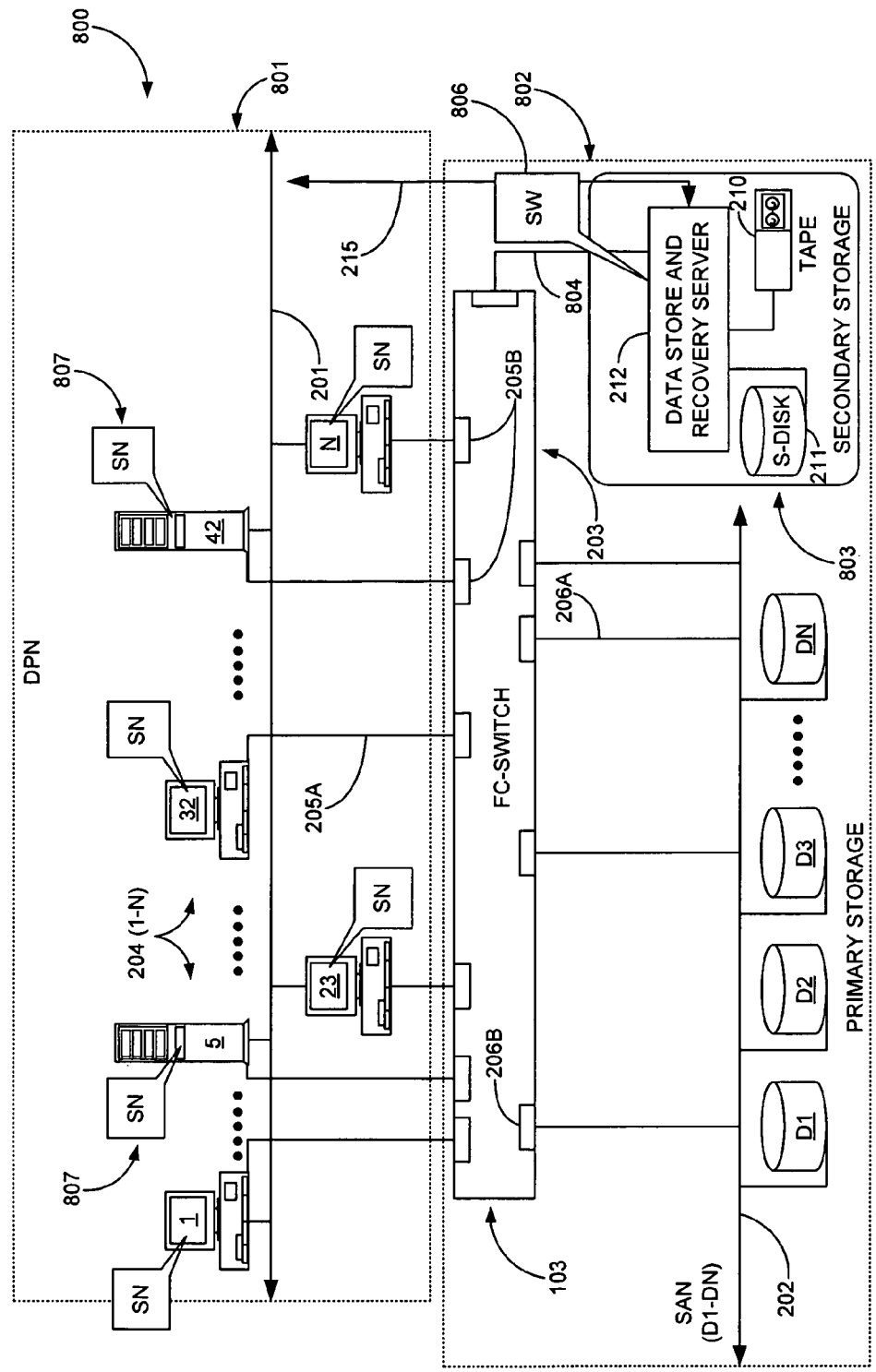
FIG. 8 is an architectural overview of a SAN-based data storage and recovery network according to an embodiment of the present invention.

FIG. 8 is an architectural overview 800 of a Storage Area Network (SAN)-based data storage and recovery network according to an embodiment of the present invention. Network 800 includes a data-packet-network (DPN) 801 and a SAN-based storage network 802. Also provided according to an embodiment of the present invention is a secondary data storage and recovery facility 803.

Network 801 may be a local-area-network (LAN), or a wide-area-network (WAN). In this embodiment DPN 801 is analogous to DPN 200 of FIG. 2 above and therefore may be an Ethernet LAN, Transfer Control Protocol/Internet Protocol (TCP/IP) enabled WAN, or metropolitan area network (MAN), which may be a wireless network.

Some elements of this example of FIG. 8 are the same as elements described with reference to FIG. 2 above and therefore some elements not significantly altered by the present invention shall retain their same element numbers of FIG. 2 and shall not necessarily be re-introduced.

DPN 801 connects hosts 204 (1-N) for communication using, in this case, network cabling 201. Illustrated hosts include hosts 1, 5, 23, 32, 42, and N. Each host in this example has connection to SAN fabric switch 103 using Fibre Channel (FC) protocols, which may be afforded the same description as given above with reference to the fabric switch of the same element number in FIG. 1. An Ethernet switch may replace switch 103 in one embodiment without departing from the spirit and scope of the present invention.

Hosts 204 (1-N) each have connection to switch 103 via high-speed optical, or in some embodiments copper connection cables 205A and north-side FC ports 205B. Switch 103 may be considered part of SAN network 802 and is included therein in this illustration. On the south side of switch 103, ports 206B provide access to primary storage illustrated herein as SAN (D1-DN).

Primary storage, in this case, encompasses D1, D2, D3, through DN and may be accomplished using raid array technologies as described above with reference to FIG. 2. Backbone 202 provides storage disk connection and disk inter-relate ability in this architecture. Network cables 206A (optical or copper) provide hardwiring between ports 206B and SAN backbone 202.

In this example, data writes to primary storage are not split-off from the host-to-storage data paths using a data splitter as was illustrated in the embodiment of FIG. 2 above with reference to data path splitter 207. Rather, data writes are read directly from primary storage and written to secondary storage facility 803. Therefore, the number of Host Bus Adaptors required by hosts interfacing with FC switch 103 will depend on the input/output load configuration of the primary storage subsystem. Likewise, the number of line cards installed in data store and recovery server, also referred to herein as a secondary storage server 212 can be significantly reduced.

Facility 803 includes storage disk (S-Disk) 211, which may be a serial advanced technology attached (SATA) or a parallel advanced technology attached (PATA) storage disk, a data store and recovery server 212 and a tape storage media 210 all previously described with reference to FIG. 2 above. It is noted herein that S-Disk 211 is not limited to a PATA or SATA disk. Disk 211 may be one of a SCSI disk, an FC disk, a SAS disk, an iSCSI disk and so on. In this example, server 212 has a direct FC connection 804 to FC switch 103, and a TCP/IP-enabled high-speed network communication line connection 215 to DPN backbone 201 for direct network communication with networked hosts 204 (1-N). In a preferred embodiment high speed optical cabling is used for storage access and high speed DSL, broadband, or other high-speed network technologies may be used for communication between hosts 204 (1-N) and server 212. All applicable protocols such as SCSI, iSCSI, FCIP, including variations or versions thereof, Ethernet, TCP/IP, and other network and data protocols may be assumed to be capably active in this architecture. For example, in the case of iSCSI, server 212 would have access to primary storage over IP using a host bus adapter (HBA) and a network interface card (NIC). In an Ethernet embodiment, the appropriate Ethernet card would be required.

Referring now back to DPN 801, each connected host configured for data backup has an instance of client software 807 termed sentinel (SN) installed thereon and executable there from. SN 807 may be provided in compatible versions for different host machines and operating platforms without departing from the spirit and scope of the present invention. SN 807 may include many or all of the functional components that were described with reference to software 500 of FIG. 5A. However, in this example SN 807 in addition to intercepting the data writes, is further enabled or adapted to map logical volume writes from the host to physical offsets on the primary storage as viewed from hosts 204 (1-N). SN 807 also records information about host data writes like logical write location (host view), origin and destination machine address information, write data and length of payload of the data writes.

Primary storage systems are typically configured to manage stored data according to prevalent protocols and user goals of the storage system. Logical unit numbers (LUNs) are typically used to identify accessible storage devices or storage partitions for accepting data from host machines for primary backup. The primary storage system assigns or allocates memory space for each data write request received from a host independently from the host act of sending the data. This allocation includes a memory offset that flags the beginning of a write wherein the length of the written data (payload) determines where the end of the write will be. Host machines might not in some cases be aware of exactly where in a physical sense their logical data writes are stored.

However, the exact disk format, and data storage system used in a primary storage medium may differ a great deal from any logical view held by a networked host charged with backing up data. In other words, a specific offset location marking the beginning of a data write from a particular host to primary storage will not be the same as or have any direct equivalence to a write location indicated in a logical-view of a primary storage.

SN 807 is adapted to provide, through a process of mapping logical volume or file system writes through algorithmic function, to the exact offsets in primary storage and bit lengths of data writes received from the particular host that the application is covering.

SN 807 is enhanced according to a preferred embodiment to resolve the exact data write offsets in primary storage using information available to the host without consulting primary storage facilities. The exact offset locations of PS data writes acquired by SN 807 are made available to secondary storage server 212 so that it may conduct asynchronous or, in some cases batched read operations against the primary storage system in order to document data revisions of valid data writes from host machines for time-based data storage backup and data recovery.

Server 212 has a software (SW) application 806 installed thereon and executable there from. SW 806 is a parent application to SN instances 807. That is to say the instances of SN 807 communicate directly with SW 806 to report true primary storage write locations (offsets) of changed data and payload lengths of data writes performed to enable reading of such information for subsequent writing to storage disk 211. The process of obtaining the true write locations in primary storage may be performed as they occur for each host 204 (1-N) in near real time. SN 807 may, in a less preferred embodiment, report or submit data-write lists to SW 806 at server 212 in batch mode for each connected host that is equipped to practice the present invention, however that feature is not necessarily practiced as it is preferred to track changes for each host continuously.

In a preferred embodiment, for each connected host, SN 807 reports true offset and payload length of data writes to SW 806 as they occur. Subsequently, data server 212 with the aid of SW 806 reads the changed data from primary storage for each separate host and applies the information to disk 211 in an appropriate manner as to be time-based recoverable. More detail about time-based storage and recovery of data is provided further below.

In one specific embodiment of the present invention, server 212 tries to maximize reads from the cache system of primary storage instead of the disk storage to help reduce read impact on the primary storage system. In this embodiment server 212 initiates reads immediately after the offset locations for the data writes (allocated write position offsets) in primary storage are known to server 212.

In actual practice of the present invention, as each host machine 204 (1-N) saves data to primary storage, SN instances 807 filter and track the saves or writes of each host according to the host-logical-view of where those writes are stored in primary storage. SN 807 also records at least the payload length of each write and performs a mapping function against the PS view to derive the "true" offset location in primary storage where the writes will be stored.

The algorithm may in some embodiments utilize certain static variables that represent pre-configured knowledge of primary storage physical architecture and may also derive results with the aid of an application program interface designed to provide certain equivalency values that may also be used in the algorithm. In addition PS driver information may also be shared with SN 807 to aid in creating a viable mapping algorithm.

It is desired in a preferred embodiment, that each host have a configurable host view, which may be an application level or file system view of its storage volume and, for purposes of recovery, access to time-stamped versions of it's backed up volume or volumes that are instantly compatible with its host view. While the host view does not reflect actual format or location of data stored in primary storage, the mapping function enables server 212 to provide any point-in-time version of a host volume over network communication link 215 to any requesting host according to that particular host view.

In this case, disk 211 could contain near term-stored data up to 120 days or more that is mountable according to time-based intervals. When a host requests a time-based view of a file, a volume, or a set of application-specific files or objects for recovery, those data are viewable and recoverable containing the specific data writes last saved for the ordered "point-in-time" time period. Therefore, a host may order versions identified by time and date of any files, application specific data sets, or full data volumes that were subject to the data backup and recovery process of the invention.

Figure 9:
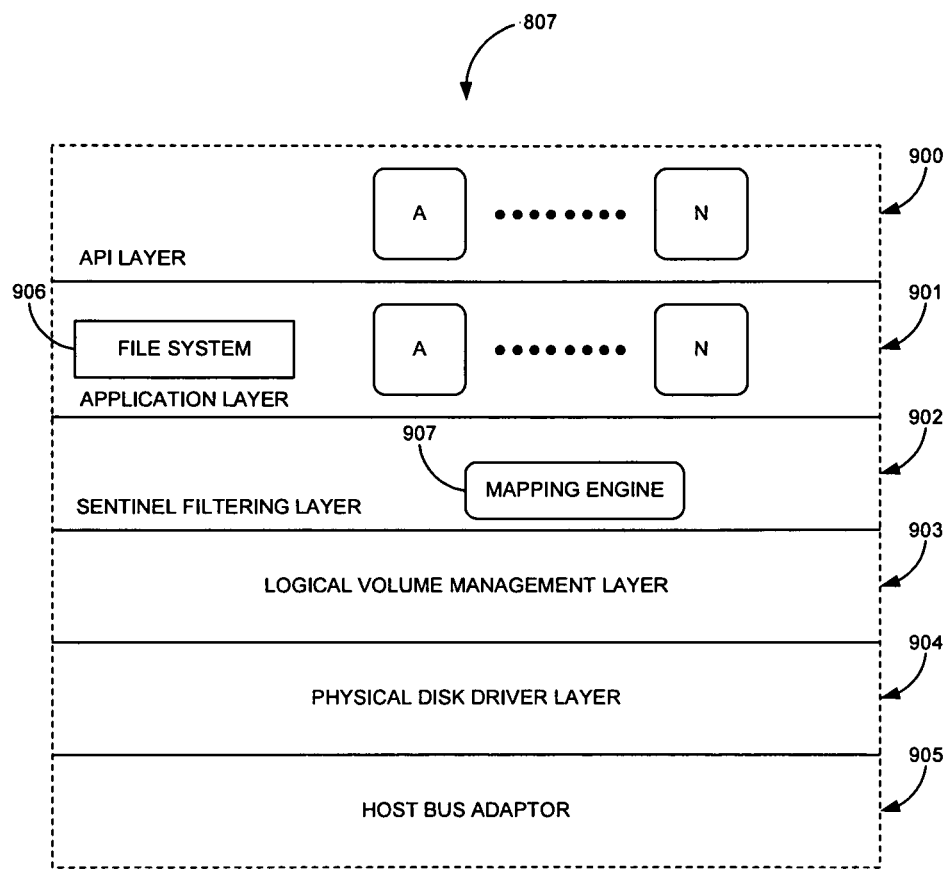
FIG. 9 is a block diagram illustrating components of a client application according to an embodiment of the present invention.

FIG. 9 is a block diagram illustrating components of a client application SN 807 according to an embodiment of the present invention. SN 807 includes a host bus adaptor layer 905 that is adapted to provide interface ability between a host and FC switch 103 (FIG. 2). Layer 905 includes all of the configurable options required for configuring a host machine to communicate with a SAN-based primary storage subsystem through a Fibre Channel switch. In one embodiment however the method and apparatus of the present invention does not require a Fibre Channel to be present such as may be the case with an Ethernet-based system. In that case layer 905 may be assumed to contain the appropriate interfacing mechanisms to enable an Ethernet embodiment of the storage system and network.

SN 807 contains a physical disk driver layer 904. Layer 904 contains one or more disk drivers required to communicate effectively with the primary storage subsystem and for controlling any direct attached storage (DAS) facilities of the host. SN 807 also contains a logical volume management layer 903. Layer 903 is responsible for providing the hosts a logical representation of the physical primary storage system (disks, partitions, etc.) that is assigned to that particular host for backing up data. A host's entire amount of backed up data may be considered a host data volume that represents the data saved for backup at any given point-in-time. Layer 903 may also provide the underlying constructs for enabling an application level or file system view of the entire data storage area allocated for the host for data backup.

SN 807 has a sentinel data filtering layer 902 provided thereto and adapted to filter data writes from hosts activity wherein those filtered writes are destined to primary storage backup. With the aid of a mapping engine 907, which may comprise an algorithm, SN 807 derives the true physical data offsets in the primary storage disks allocated for the data writes filtered from the host activity. Layer 902 further contains processing components for compiling write information containing at least the description of the write relating to host machine address and destination machine address including at least the storage device address or LUN, payload bit length and true offset flag or point (derived through mapping) of each write saved to the primary storage subsystem.

SN 807 has an application layer provided therein and adapted to present the application or file system view of the logical volume of the host in relation to each application listed as present on the host and configured for data backup. For example, the file system may be NTFS or UFS whereby the files are organized and viewable according to the file system format. In this example, applications A-N are illustrated as participants of the backup system. In other words there may be one or more than one application configured to back up data to primary storage at each host. From an application perspective, a host operator may see only application related data whereas in an overall view the operator of a host may view an entire volume.

SN 807 includes, in one embodiment, an application program interface (API) layer 900 adapted to include any included and possibly optional APIs, illustrated in this example as APIs A-N, for performing stated tasks in cooperation with backing up data to secondary storage according to embodiments of the present invention. One or some of APIs A-N may be configured for, among other things, communication to SW 806 residing in server 212, for example. Likewise one or some of APIs A-N may exist in some embodiments and may be used to aid mapping between logical write location and primary storage write offsets for host data writes. Also, one or some of APIs A-N may exist within layer 900 and be utilized for data-write flushing during application level processes configured for practice of the present invention such as a process of batch read during active data backup periods. Likewise, APIs may be provided within the logical volume level, file level, and application level as well without departing from the spirit and scope of the present invention.

One such application level process may be that of a read of primary storage space assigned to a host machine. If, for example, new writes are application-pending to PS while a read operation is in progress at those write locations, then the API may be used to flush all of those application writes quickly from the host application so that they may be copied on write (COW), a process generally known to and available to the inventors, and held separately from the snapshot until it is confirmed whether they are valid writes that equate to data changes. This is performed to enforce write ordering in an embodiment whereby SW 806 performs data reads.

In this example, mapping engine 907 can aid in recreating file system views of recovered files and entire data volumes from near-term storage (disk 211) by providing the correct write location mapping and the host/application level identification of the data changes occurring to the volume data over time. In one embodiment of the present invention, the metadata file redundancy verification process described further above with reference to FIG. 2 may be used to verify data writes acquired by read at server 212. However, this is not required in order to successfully validate data changes as the read process can compare the compression gain or loss with the same offset location at a last point-in-time position of the data. More specifically, new data can be verified quickly by bit-length comparison and other means with the data existing in a last version of a host volume.

Figure 10:
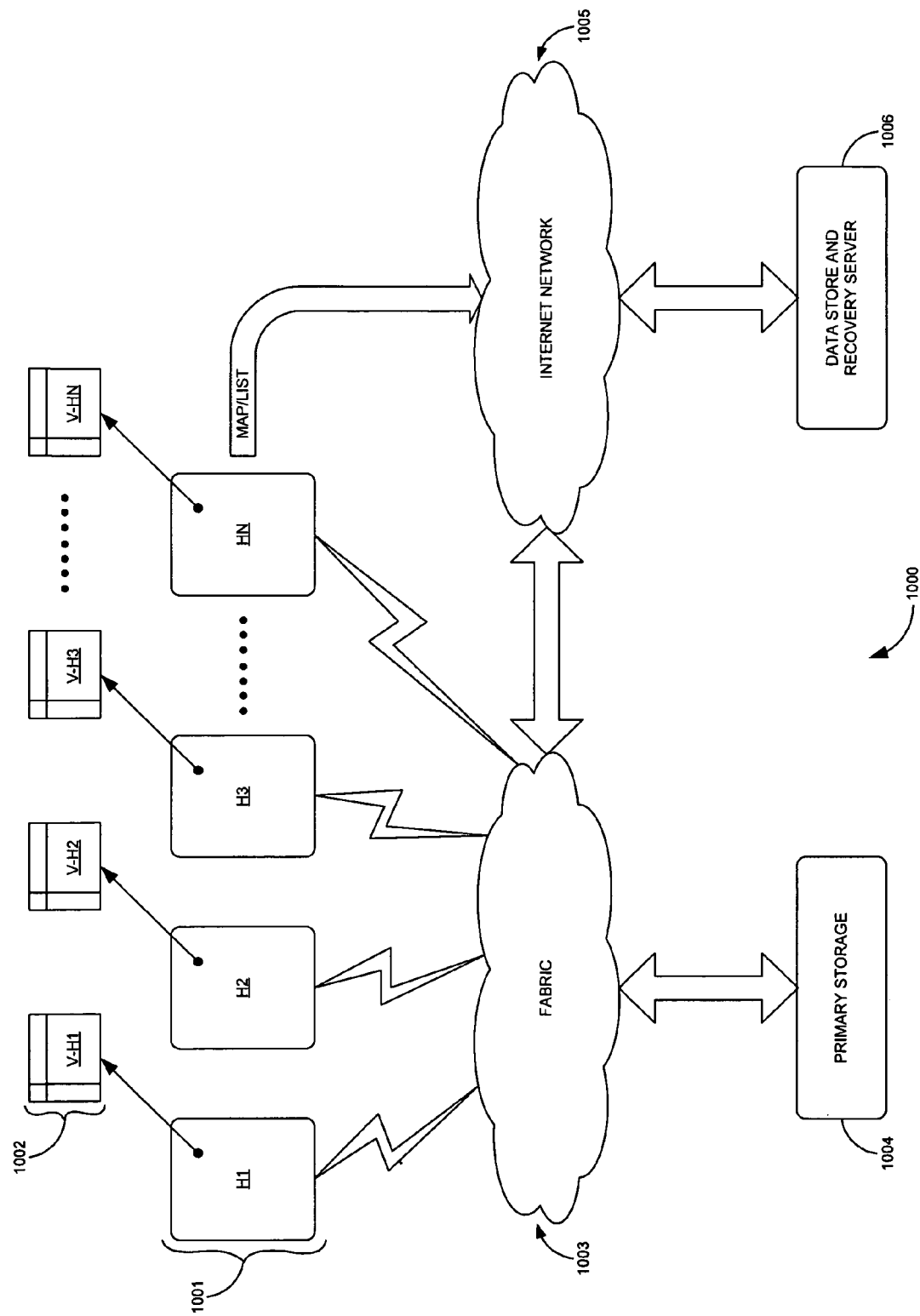
FIG. 10 is a block diagram illustrating data access from primary storage according to an embodiment of the present invention.

FIG. 10 is a block diagram 1000 illustrating data access from primary storage according to an embodiment of the present invention. In this example, host machines are illustrated logically as host machines 1001 (H1-HN). Each host 1001 has a volume 1002 collectively illustrated herein as volume host 1 (V-H1) through (V-HN). Volumes 1002 are considered logical host-view data volumes organized as higher-level file system or application level views. Each volume 1002 V-H1-V-HN represents a portion of data stored at primary storage 1004 that needs to be backed up by the host. Hosts 1001 continuously save data to primary storage 1004 through fabric 1003 as illustrated. Correct data write information including data write location information in primary storage is compiled by each host and sent after the mapping layer algorithms are applied. This mapped information (Map/List) is sent to a data store and recovery server 1006, in this case, over IP through Internet 1005. However, the Internet is not specifically required to practice the present invention successfully. Data store and recovery server 1006 may be, in one embodiment, a CPE implement accessible over a LAN or private WAN.

The map/list information forwarded to data store and recovery server 1006 amounts essentially to instructions for reading the described writes from SAN-based primary storage 1004. In a preferred embodiment, changes are tracked continuously as they occur, meaning that Host sentinels report data writes and mapping information to server 1006 for each save to primary storage as it occurs for each host. Data store and recovery server 1006, analogous to server 212 of FIG. 2 may perform read operations in a manner to effect a low impact on the primary storage system such as reading from primary storage buffer systems or system cache so long as frame decoding information and true offset locations are known. In a preferred embodiment, server 1006 is reading data writes made to primary storage in a continuous manner.

If server 1006 is remote then access to primary storage system 1004 may be accomplished over IP using an iSCSI/HBA/NIC configuration. In another embodiment server 1006 has port access to FC Fabric 1003 via SCSI and HBA.

In another embodiment of the present invention, primary storage system 1004 is a SAN storage island held remotely and accessible to host machines 1001 via the Internet or another WAN network using an iSCSI/HBA/NIC configuration. There are many configuration variables that are possible without departing from the spirit and scope of the present invention.

Figure 11:
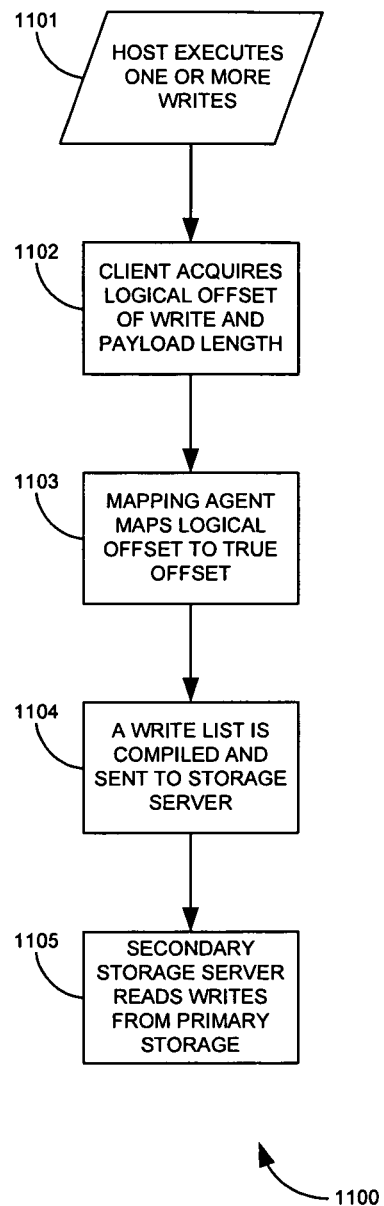
FIG. 11 is a process flow diagram illustrating steps for enabling read access to primary storage from a secondary storage server according to an embodiment of the present invention.

FIG. 11 is a process flow diagram illustrating steps for enabling host-instructed read access to primary storage from a secondary storage server according to an embodiment of the present invention. At step 1101, a host executes one or more writes destined to primary storage. At step 1102, the client, or more particularly, the sentinel acquires the logical offset of the one or more data writes and bit lengths of the associated payloads. Also, the sentinel filters out the origin and destination addresses, host name, and other pertinent decoded information that may help to identify the data writes.

At step 1103, a mapping engine or agent maps the logical or host-view location or offset of the data write to an actual or true offset position in a primary storage subsystem. This may be accomplished using an algorithm that incorporates some knowledge of the primary storage architecture and data storing procedure. An API may be provided, as previously described, for contributing architectural and storage scheme and format knowledge to the mapping process.

At step 1104, a write list or series of write descriptions including write access instructions is compiled by each host sentinel and forwarded over a separate network other than Fibre Channel to a secondary storage server analogous to server 212 described previously. These instructions preferably arrive in a continuous data stream and the data is immediately acted upon according to host instruction at step 1105 wherein the secondary storage server reads the write data from primary storage thereby obtaining the changed data for the hosts and applying the changes to secondary storage disk analogous to disk 211 of FIG. 2 above.

Before secondary storage of data begins for a host, each host having data for backup and an allocated LUN for storing the data in primary storage has its initial volume read by the secondary storage system and stored in near term storage. Thereafter, only the changes are read and stored according to some configurable time frame for time-based recovery purposes and the volume is rolled up to each time interval where the changes are applied over the old data writes affected by the new changes. Therefore at any specified point-in-time, a host may order a snapshot logical view of the entire volume including the latest changes applicable to that specific time. This may be relevant to one or more specific application objects, files or to an entire data volume. More particularly, data recovery from secondary storage may be file based, volume based, or application object based. A host may order a snapshot according to any configured safe point in the past and receive the view including the exact file versions or changes that were applicable at that time. The unaffected volume is simply rolled forward or backward along the time line to complete the mountable view as will be further described below.

Figure 12:
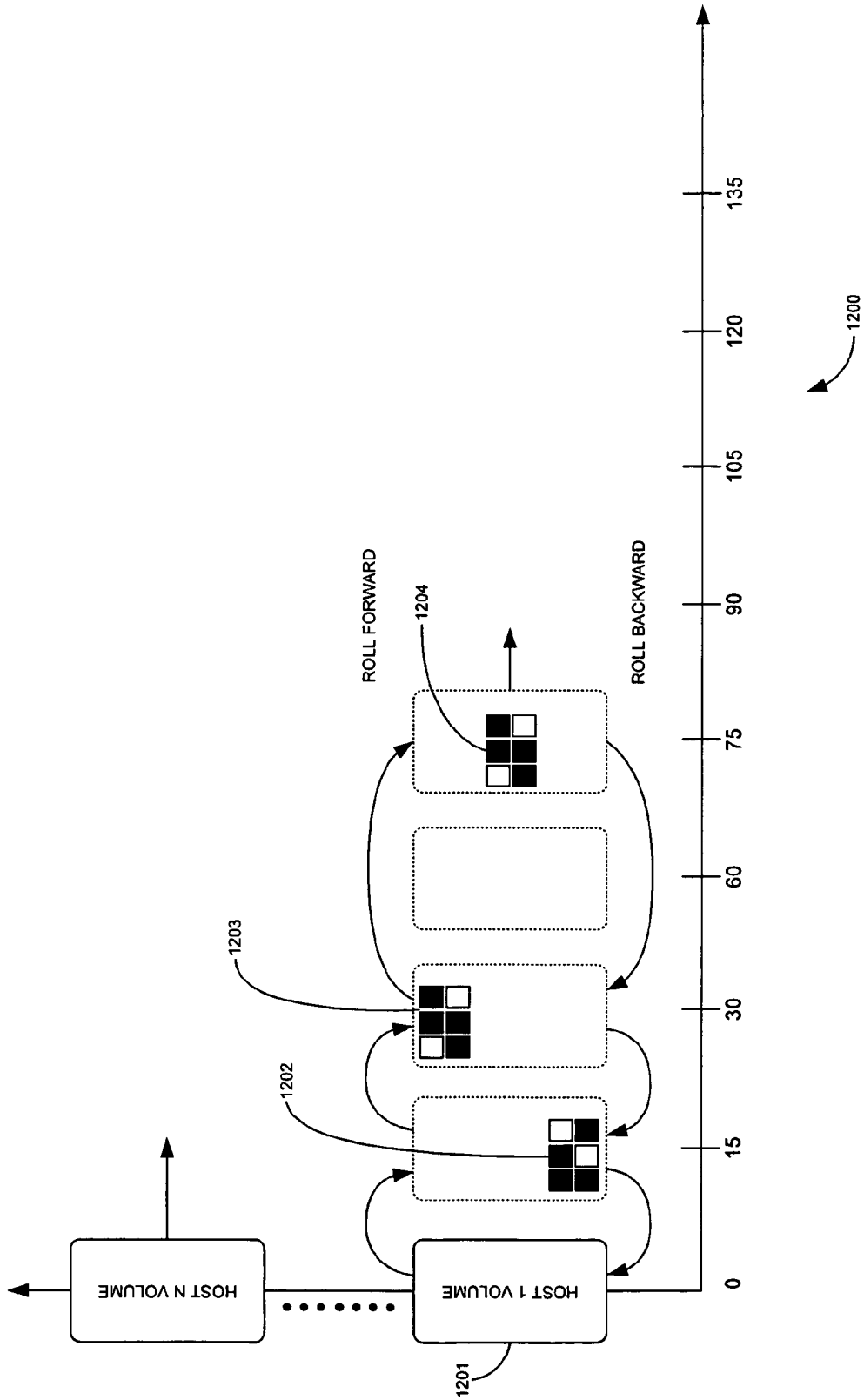
FIG. 12 is a time-based graph illustrating volume management in time-based data storage according to an embodiment of the present invention.

FIG. 12 is a time-based graph 1200 illustrating host volume management in a time-based data storage application according to an embodiment of the present invention. Graph 1200 has an exemplary time line starting at 0 time and progressing at 15 minute intervals to illustrate points along the time line that are potential data recovery points-in-time. It is noted herein that the time period reflected is only an example. The smallest granularity possible is at the individual write I/O level. At time 0, the secondary server must have available by previous read operation a host back-up volume of data illustrated herein as Host 1 volume 1201. This must be accomplished before secondary data backup can begin. This is true for all host machines to be configured for secondary storage backup as is illustrated herein by inclusion of a host n volume at the same 0 point in time. The "Y" line simply illustrates that multiple hosts may be backed up for time-based data snapshot view or snapshot recovery using the methods and apparatus of the present invention. Moreover, each host may be configured for entirely different time-line recovery points. For example, instead of providing a volume view for every 15 minutes a host may be configured for every 25 minutes or every 5 minutes, for example. Similarly, multiple hosts may be provided a tier snapshot for n hosts wherein each snapshot of host volume for all of the participating hosts represents the latest view of the hosts' volumes at the specific point-in-time.

In this example, at 15 minutes time the secondary server has read, validated and stored to secondary disk (near term storage) new data writes 1202. Data writes 1202 were read and stored between point-in-time 0 and point-in-time 15 minutes as an example. The host machine may now order a snapshot view of host volume at point-in-time 15 minutes on the same work period date and will be served the volume view including writes 1202. The host may instead order a view of a certain file at time 15 minutes. If the file contains writes 1202 then that file has two separate recoverable versions if it existed at point-in-time 0.

The host machine may also order an application view or a view of all of the data specific to one application that is running and being backed up to secondary storage. In this case data writes 1202 may be specific to only one or a few files updated by the application in question. To show all of the applications data, the application data at point-in-time 0 is logically rolled up and the new writes 1202 replace the old writes of the same files if they existed. It is also possible that the new writes 1202 did not have earlier versions, for example, new account information that was acquired between point-in-time and point-in-time 15 minutes. It is noted herein that rollup is logical only. The data is overlaid over the full volume using in-memory or on-storage data structures and accompanying algorithms.

At point in time 30 minutes, a snapshot is available of the host volume of point-in-time 0 plus writes 1202 and new writes 1203, that were read between point-in-time 15 minutes and point-in-time 30 minutes. If writes 1203 represent overwrites of writes 1202, then writes 1202 would not be visible in a point-in-time snapshot taken for time interval 30 minutes. However, data writes 1202 are still recoverable by rolling back to point-in-time 15 minutes. If data writes 1203 are of different application files and are not related then both writes 1203 and 1202 are visible in a snapshot of point-in-time 30 minutes on that particular day. It is noted herein as implied above that the time period referred to in this example is exemplary and pertains more to periodic firing of a consistency enforcement measure and is not a limitation concerning the ordering of time-based views. Of course, time based views can be order for any time period.

The host volume is simply rolled up or back for snapshots wherein the appropriate time-based versions or writes that were read between the last time and the snapshot time apply and can be viewed and recovered. At point-in-time 60 minutes, there were no data writes to primary storage from the host. In this case, the host volume does not need to be rolled forward in the event of an ordered snapshot taken at point-in-time 60 minutes. The last point-in-time snapshot of 30 minutes is served instead because it contains data changes to the volume. At point-in-time 75 minutes, new data writes 1204 were read and stored since the last point-in-time interval of 60 minutes. Again as described further above, snapshots may be ordered at any time as data read and write operations are performed continuously.

The process for each host ensues throughout the work period for up to 120 days being applied to near term storage before old data is offloaded to tape or other long-term storage media. However, point-in-time snapshots may also be taken from long-term storage. Any host may change the point-in-time snapshot interval for data view and recovery. Likewise, a snapshot view may be created asynchronously by instruction from the host. For example, a host may at any time create a point-in-time where the host volume may be viewed containing the latest file or data revisions.

In one embodiment, a host that is configured for synchronous point-in-time snapshot may insert additional points-in-time asynchronously meaning they do not follow any specific time interval or pattern. In addition, point-in-time intervals may be synchronous, not in a time sense, but in an event-driven sense. For example, a host may order that when new writes reach a data size threshold, a point-in-time interval is created that can be viewed as a snapshot containing those writes. The next point-in-time interval is then created when new writes since the last created point-in time again reach the size limit. Likewise, a combination rule can be created that incorporates a regular time interval and a data write size accumulation threshold.

It is important to note herein that if a host orders a view that falls in between two points-in-time, then the particular view may not be the most consistent view as consistency measures are enforced according to pre-specified time interval. Nevertheless, a snapshot view may be served at any requested time.

A host may also select multiple snapshots covering a span of time for a file, a set of application files, or for an entire volume. In this case, the host may, after review, mount to a selected volume or recover a selected file, data set, or volume of application specific data from the volume. The system of the invention provides a file system, file level, or application level view of the host volume in addition to providing a view of the whole volume according to a file system perspective.

The point-in-time snapshot feature may be further granulated for two or more hosts that may be writing to a same volume (volume sharing). In this case, each host has an own specific view of the shared volume and may also have same or differing point-in-time intervals. Moreover, an administration snapshot may be ordered for a shared volume wherein data backed up by all of the hosts of the volume are visible. Furthermore, a volume may be shared for backup, but not necessarily accessed simultaneously by hosts, which is the more common occurrence in practice where different hosts share one volume.

In one embodiment of the present invention for any particular host, a data write can be validated against data written to secondary storage previously by comparing two consecutive snapshots. For example, if a save occurs that is an overwrite of a same write of a previous snapshot the system can compare the new write against the old write and determine if the payload has any compression gain or loss, or is of the same exact length, or has the same checksum value. If it is wholly the same then the new write can be discarded as redundant data. If the data is partially different, then only the differential data is stored.

In a more complicated validity check, using a metadata hash table containing metadata of previous writes from all of the hosts for a certain period of time can be used to perform redundant data identification from more than one host having more than one separate volume. Any new write for any new host can be checked against the table and if it is redundant then it can be deleted because another host has written the same data to another volume. These volumes can be integrated in terms of data representation such that a data write that is exactly the same among more than one host machine can be physically represented on host volumes by a pointer to a single host volume where it was first saved as a non-redundant data write. This embodiment assumes importance when multiple hosts are providing some service collectively such as customer-relations management (CRM).

It is noted herein that to server a point-in-time snapshot according to a request from a host, the secondary storage server must access the secondary disk (near-term storage) and read the changes stored for the period ordered. Data already transferred to long-term storage must be rendered back to disk storage before it may be recovered. The volume applicable to that period is rolled up from the last period or back from the next period to complete the volume view if the entire volume at that time is made available. The host's logical specification of a file, set of files, or volume including the requested time reference is sufficient for serving views and for allowing drive mounting of the data.

Figure 13:
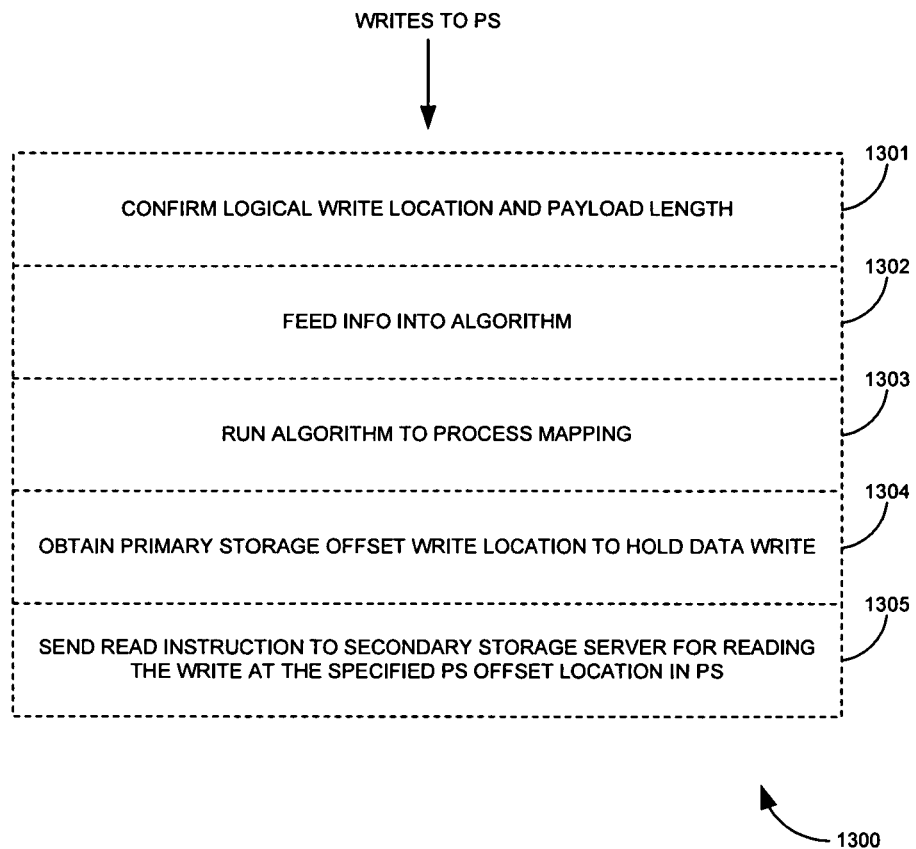
FIG. 13 is a block diagram illustrating basic steps for translating logical write location to true offset location in primary storage according to an embodiment of the present invention.

FIG. 13 is a block diagram 1300 illustrating basic steps for translating a logical write location to true offset location in primary storage according to an embodiment of the present invention. Block 1300 represents the mapping engine 907 described further above with reference to FIG. 9. Block 1300 is, in a preferred embodiment installed on each machine host as part of a sentinel software component that is part of a client software instance analogous to SN 807 described with reference to FIG. 8 above. Each time a host machine writes to primary storage, the writes are analyzed for information at step 1301 to obtain at least the logical (host view) write location and the write payload length. Other information such as host machine address, destination machine address, LUN identification, and other frame attributes may be collected.

At step 1302 the write information is fed into an algorithm adapted to provide mapping between host write location and actual primary storage offset location. At step 1303, the algorithm processes to derive the offset location at the destination for the write. The offset is allocated by the primary storage system for the storage device (LUN) that the host machine has permission to write to.

At step 1304, the true offset location for the data write is obtained and the other parameters of the write frame or frames are known. Using the LUN and offset information, block 1300 prepares read instruction that the secondary storage server may use to access the appropriate destination device and offset location to read the write. At step 1305, the read instruction is sent to the secondary storage server.

In one embodiment, all host machines that write data to primary storage and are configured for secondary storage backup using the methods and apparatus of the present invention send their write instructions in a combined data stream to the secondary storage server over an open TCP/IP or other WAN connection. This may be a secure high-speed data link analogous to link 215 of FIG. 8. In a preferred embodiment, the secondary storage server performs read operations according to the host instruction in near real time as the instruction becomes available using an HBA-enabled link through the FC switch using the FC and SCSI or iSCSI protocols.

In another embodiment, a number of read instructions are compiled as a read list before sending the read list to the secondary storage server. When the storage server is reading from a primary storage disk on behalf of a host, it is possible that one or more new writes may come in to a same offset location that is being read during the read operation. To avoid any consistency problems during read, an API is used to flush any write data an application, a file system, or the OS may have pending. These writes are then copied before they are sent through using an algorithm and written to a buffer, cache, or other secondary storage location. If any flushed writes apply to offset locations just read, they are compared against those writes to determine if they are redundant. Redundant data is discarded if encountered while the rest of the change data is applied appropriately.

In still another embodiment, the host mounts the entire volume and performs its own recovery at the file system, application object, or volume levels. In yet a further embodiment, the secondary server does al of the recovery mapping without the involvement of the host. In this case the server exposes just the file/application objects through any of multiple standard protocols such as CIFS, NFS, HTTP, FTP, or through custom APIs adapted for the purpose. There are many possibilities.

Figure 14:
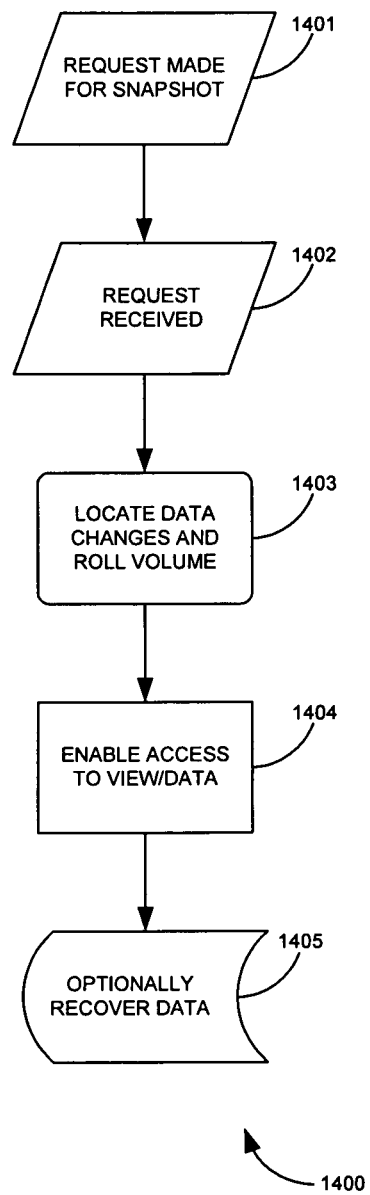
FIG. 14 is a process flow diagram illustrating a process for providing a point-in-time snapshot to a host according to an embodiment of the present invention.

FIG. 14 is a process flow diagram 1400 illustrating a process for providing a point-in-time snapshot to a host according to an embodiment of the present invention. At step 1401, one or more host machines request a point-in-time snapshot view according to some point-in-time reference of volume, files, or application-specific data files or data sets. If multiple hosts initiate a request then each of the host will receive its own private logical snapshot that it can read and write to. There is no handshake requirement among the host machines for receiving the point-in-time snapshot for the requested period and data order instructions.

At step 1402, the secondary storage server receives the request of step 1401. At step 1403, the secondary storage server locates the point-in-time data changes stored on near-term disk (211) for the host according to the host instruction including time reference, specific name of data, for example volume Z, or application name (all files), or file name reference. It is noted herein that the specific file references including name, type and other information have request parameters that are of the form of the requesting host's logical view of the system. The secondary storage sever may maintain a logical host-view of each host's data and has the capability of mapping the actual stored data to that view. At the same step, the volume data that is original and that has not changed is rolled forward or backward and associated with the found data changes for the specific point-in-time ordered. Those data changes overwrite previous data for their offset locations to complete the view of the volume data for the ordered period.

At step 1404, the secondary server presents or serves the point-in-time view to the requesting host according to that host's requested view parameters. The secondary storage server may also serve more than one view of the same point-in-time reference to more than one host, which may be sharing the view according to different viewing perspectives. It is important to note herein that ISCI, FCP, and TCP/IP sockets based proprietary protocols to enable a host to mount volumes from logical snapshots. For example, there may be an application view of a volume requested for one host and a different application view requested by another host of the same point-in-time reference. Likewise, an administrator may request a point-in-time volume view inclusive of all applicable application files whereas application-specific requests are ordered for the same point-in-time reference by other hosts. There are many possibilities.

At step 1405, the requesting hosts may elect to mount a data volume represented by the point-in-time view as it looked during the time interval requested. Actual data recovery is conducted between the hosts and the secondary storage server over a channel other than the Fibre Channel such as over a TCP/IP enabled network line analogous to line 215 of FIG. 8.

In one embodiment of the present invention, a single host may specify a time and date range and may order several views of its volume, each view representing data as it looked during a covered point-in-time. A host machine, or an operator thereof, may select and sample (read only) files from any of the views before making an optional decision to recover a specific volume.

In one embodiment of the present invention, data recovery to a host of a particular point-in-time may involve transcending application versions or further, operating system platforms. In this case, the inventors provide applicable virtual machines that can process and present the requested data views according to past application versions or operating system parameters which are viewable on the present host system. Likewise the data stored according to past application version or system parameters can be made viewable and recoverable according to the present application versions and operating system platform of the requesting host.

The methods and apparatus of the present invention can be incorporated as an overflow option or as an alternative option to passive data splitting described further above for acquiring data from hosts for secondary storage. The described data view and recovery methods may apply both to passively split data and to SAN-Based read data without departing from the spirit and scope of the present invention.

SAN-Based Backup Logging and Read for Backup

According to another preferred embodiment of the present invention, the inventor provides a method for logging actual host data write activity and metadata generated and associated with the write activity for the purpose of data read and data backup at a secondary storage location in a fashion that eliminates the necessity of LAN traffic associated with data backup activities and eliminates requirements for direct read access of primary storage volumes.

Figure 15:
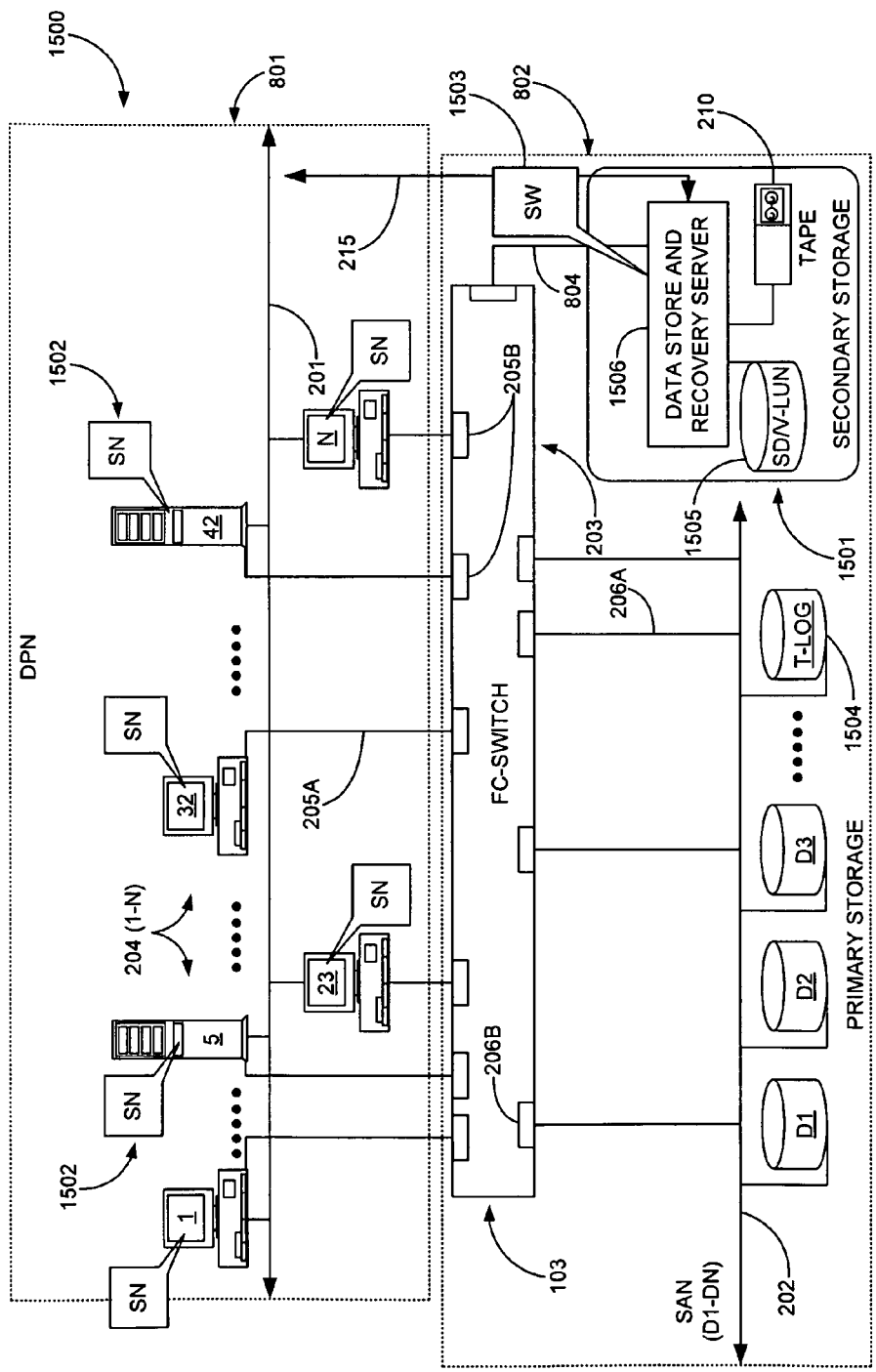
FIG. 15 is an architectural view of a SAN-based data storage and backup system according to another embodiment of the present invention.

FIG. 15 is an architectural view 1500 of a SAN-based data storage and backup system according to an embodiment of the present invention. Architecture 1500 is similar to architecture 800 described with reference to FIG. 8 above. Therefore, many of the elements already described shall not be re-introduced unless they are fundamentally modified according to embodiments described below.

DPN 801 may be a LAN or a WAN. In this embodiment DPN 801 is analogous to DPN 200 of FIG. 2 above as was previously described above and therefore may be an Ethernet LAN, Transfer Control Protocol/Internet Protocol (TCP/IP) enabled WAN, or metropolitan area network (MAN), which may be a wireless network.

Hosts 204 (1-N) all have connections to a FC-Switch in this example via north-side FC switch links 205A to associated ports 205B installed on switch 103. SAN 802, which includes the domain of FC-Switch 103, contains primary storage system (D1-D3), and an addition to primary storage memory illustrated herein as a transactional (T)-Log 1504. T-Log 1504 may be provided in the form of a shared transactional data log adapted to receive actual write data and/or metadata from each of hosts 204 (1-N). In another embodiment each host may have a separate T-Log assigned to it. T-Log 1504 is not a mirror of any portion of the primary storage system. Rather, T-Log 1504 contains write data from each separate host or all hosts as the data is written to the appropriate LUN devices or data volumes maintained for each host in the primary storage system.

In this example, T-Log 1504 is shared by all hosts charged with data backup to the primary storage system and the organizational nature of T-Log 1504 is that each host 201 (1-N) writing to primary storage duplicates it's data writes to T-Log 1504. The write transaction records for each host may be organized in the form of a plurality of log transaction entries including embedded metadata information about the parameters of those transactions. Each entry then contains, in one embodiment, the actual write data including the generated metadata associated with the actual write data. In an alternate embodiment, the log data may include only the metadata that describes the actual data writes, the metadata enabling the secondary storage system to access and read the actual write data from primary storage.

T-Log 1504 may be managed as a LUN or partition of a LUN on a primary storage system set to sufficient size, in this example, for accepting the combined data from all of the hosts for any given period of time. For example, if all hosts are writing at the same time, T-Log 1504 shall be sufficiently large to accommodate all of the written data and the associated metadata.

Each host 204 (1-N) has an instance of client software (SN) 1502 provided thereto, which is significantly enhanced from the previously described SN 807 of the example of FIG. 8. In a preferred embodiment, each instance of SN has preprogrammed knowledge of the existence and location T-Log 1504 including having a utility for managing the host's own transactional record. Therefore, instead of using LAN 201, or separate network 215 to propagate any primary storage read or write activities or metadata describing such activity, hosts 204 (1-N) append their write activity directly to T-Log 1504 in real time through Fibre channel switch 103 in a managed fashion, which will be described further below. As described repeatedly throughout this specification, Fibre channel switch 103 may also be an Ethernet switch running iSCSI protocol.

As described further above, T-Log 1504 may have a LUN assigned thereto and may further be divided for transactional integrity according to Sub-LUN or SLUNs so that each host may own or may be assigned to a variable or dynamic portion of the log volume by SLUN. For example, if host 204-1 is writing to primary storage to D1 under LUN assignment, the write may also be duplicated to the appropriate LUN and SLUN in T-log 1504 for that same host the duplicate write may include metadata describing the write data at the application level and the bit length of the data write. The metadata may also include, among other things, the beginning or offset location of the write as mapped from primary storage, the payload length of each write frame, and the checksum figures for each frame of the write.

In this example, a secondary data storage and recovery facility 1501 is provided and is largely analogous to facility 803 described with reference to FIG. 8 above except for how write data is accessed from the primary storage system. Facility 1501 has a data store and recovery server 1506 provided therein and adapted with an instance of parent SW 1503. SW 1503 is adapted to access T-Log 1504 periodically in an asynchronous mode, or in near real time synchronous mode for the purpose of reading data from T-Log 1504, backing that data up to a secondary storage disk, an then clearing the log entry from the log volume.

In an alternate embodiment, a virtual (V)-LUN is provided by the Secondary Storage Server and obviates the need for T-Log 1504 to reside in primary storage. Such an embodiment will be described further below. In the first embodiment server 1506 may access T-Log 1504 in the primary storage system over FC link 804 to read the write data and embedded metadata, backup that data following redundancy protocols, and clear transactional entries related to actual data write activity from the log volume to free it up for more write data. The data read from log volume 1504 is checked for redundancy against near term storage data for the same host and is added to near term storage for that host. A unique synchronization protocol is provided and adapted to ensure that a host is not writing data to a portion of the log being read by server 1506 for that host. The protocol may also be used to synchronize writes from the separate hosts into the log volume. More about synchronized access and control permissions for log read and write access will be detailed later in this specification.

In the case of provision of a shared T-Log 1504 within the domain of the primary storage system, hosts 204 (1-N) write to PS as they normally would through an FC channel, however those writes may be duplicated for each host into T-Log 1504 using the host assigned FC channels or a special FC channel adapted for the purpose. Metadata including the mapping of the true offset positions used in primary storage is appended to the log and embedded with each write session for each host.

In one embodiment, the log volume itself is presented to or may be viewed by host nodes and the secondary storage system server in a file system format or other proprietary formatting. Data byte limits may be allocated for each container or file of the system containing write data from a host. In this embodiment, a bit flag is set for each data write pending. The bit is cleared when the change data is logged to the secondary storage. Secondary storage server 1506 aided by SW 1503, may access T-Log 1504 and may be granted permission to read from files, containers or blocks that have the bit flag set indicating that the file is complete and ready for archiving.

If more than one host writes the same exact data, that data is duplicated for each host into the log volume under the appropriate partitions or SLUNs. When the data is read by server 1506, the server performs appropriate redundancy checks before backing up that data to a secondary storage disk for near term storage. The metadata enables the secondary storage system to save the appropriate change data into time-based records for each separate host for near term disk storage. In one embodiment, T-Log 1504 may possess a capability of managing itself to reduce instances of redundant data duplicated thereto by host nodes and to cross-reference host identifications to instances of same or unchanged data blocks, files or containers. In a preferred embodiment all redundancy checks and operations are performed at server 1506 before backup to secondary storage disk. When practicing "any-point-in-time" data recovery, more data is typically stored so a method for reducing such storage space may be required, hence redundancy practices are used to eliminate the need for extra storage space.

In one embodiment of the present invention, the primary storage system is capable of data stripping (storing more than one data record) from one set of data from one host. In this case, the data stripping utility may also be adapted for appending T-Log 1504 with a copy of the record including the associated metadata. In any case, redundant writes may be eliminated from the secondary storage view of T-Log 1504 by virtue of comparison to data already stored for any host data is being read for. As server 1506 reads data from T-Log 1504, it may also, in a preferred embodiment, clear data write log entries of all data during the same session. If a file system format is adopted, or even if data containers, buckets, or lower level blocks are used, then server 1506 may reset bit flags after clearing data to indicate empty memory space that may then be repopulated by hosts. By the same token, hosts may not write to a file that is currently being read by the secondary storage server. Bit setting for access permissions may also be applied to logical data blocks or clusters of data represented in T-Log 1504 as opposed to a file system formatting.

In another preferred embodiment, instead of providing T-Log 1504, a plurality of Log volumes to a primary storage sub-system, one or more virtual LUN Log volumes may be hosted in secondary storage system 1501, perhaps on disk 1505 or in server memory provided and allocated for the purpose. In one embodiment, a single virtual LUN defining a log volume may be assigned to all hosts writing to primary storage and virtual SLUNs may be assigned per host using the space. In this case the log functionality may be the same, as that described above with respect to T-Log 1504. However in the latter case, the access and read functions are internal to the secondary storage system and server 1506 does not have to communicate with the primary storage system at all.

Hosts writing to primary storage generate the metadata and mapping information as previously described and duplicate their writes to their assigned data volumes in primary storage while at the same time writing the data using, in this case, the channel connecting the secondary storage system to the FC switch (FC link 804). This represents a push embodiment that eliminates any requirement for direct read from the primary storage domain. In this case, the read activity from the transactional log is internal. The synchronization between server 1506 and any of hosts 204 (1-N) is the same. That is to say that server 1506 may read from the log wherein bit flags are set indicative of completed records that will not incur more data and hosts may write to the log wherein bit flags are set indicative of file space or memory blocks that have been cleared of data and are ready to accept new data.

Read access performed by server 1506 may be programmed to occur in a synchronous mode or asynchronous mode in the virtual LUN embodiment as data becomes available, or in an asynchronous manner in the T-LUN embodiment where the server periodically access the log volume to read and clear data. A benefit of providing the log internally within system 1501 is that it may be hosted in static random access memory (SRAM), which is faster than dynamic random access memory (DRAM). Also the log volume may be hosted on a cached disk using protocol extensions SCSI, FC, SATA, PATA, and the like. Therefore the speed of journaling writes for multiple hosts may be maximized using various forms of fast memory management internally available to system 1501. The log access, read and clear operations are not dependent on existing primary storage system limitations. One with skill in the art will recognize that reading from and then clearing log entries is much faster than accessing and reading data from a robust primary storage system.

In still another embodiment, a virtual log volume is not necessarily required and direct reads from primary storage are also not necessarily required in order to practice the present invention. In this case, an application may be provided to the secondary storage server, the application enabled to listen for all data writes from the protected hosts and to facilitate writing those directly to the secondary storage medium. In this case, sentinel software splits the writes from each host, one to primary storage and one to the provided application, which in turn accesses the secondary storage medium and writes the data to secondary storage on behalf of the host. It is important to note herein as well that the communication between the protected hosts and the secondary storage system is not necessarily limited to any particular protocol. For example, the write data may be transferred using a variety of standard data transfer protocols like file transfer protocol (FTP), hypertext transfer protocol (HTTP), FCP, SCSI, iSCSI, FCIP, and so on.

In one embodiment, an enhancement referred to herein as a tag synchronization protocol (TSP) may be used to perform time-based synchronization between multiple protected hosts and one or more secondary storage servers located at one or more than one network site on a network where latency issues may be a factor. This protocol (not illustrated), adjusts for differing latencies related to backup and recovery due to network diversities. Latency issues may arise from states like different time representation among multiple application servers running an enterprise application. Likewise, network latencies related to data transfer from those separate server nodes to one, or in some cases, more than one secondary storage server may vary quite a bit.

Using a tag synchronization protocol may enable a more accurate return of a particular "state-of-application" with respect to actions or writes performed on the multiple protected application servers at some requested point in the past. This is particularly important where some application writes depend on other application writes for purposes of validity, consistency, security, or understanding.

A protocol such as this may be used with or without APIs already discussed may, in some embodiments, to form a basis for enabling consistent backup synchronization procedures. In an alternate embodiment, synchronization for backup may be based on a concept other than time. For example, it may be based on application states reached on one or more of the secondary storage servers. For example, the backup and recovery software may use indexing by event and time, or just by event or state to optimize file recovery.

In still a further enhancement, the concept of time bands may be used in conjunction with time based backup synchronization. Due to possible network diversity, different speeds, number of hops, routes etc. it may not be possible in all cases to achieve perfect synchronization of tags based solely on time. A time-band is a small period or window of time that bounds a set of differences (data changes) that were generated on the protected servers. The time-bands enables determination with near certainty the relative order of differences that were produced by different protected host servers. The determination itself can occur anywhere the software of the present invention resides. In still another enhancement, the writes themselves can be ordered synchronous from the protected hosts to the secondary storage servers.

Figure 16:
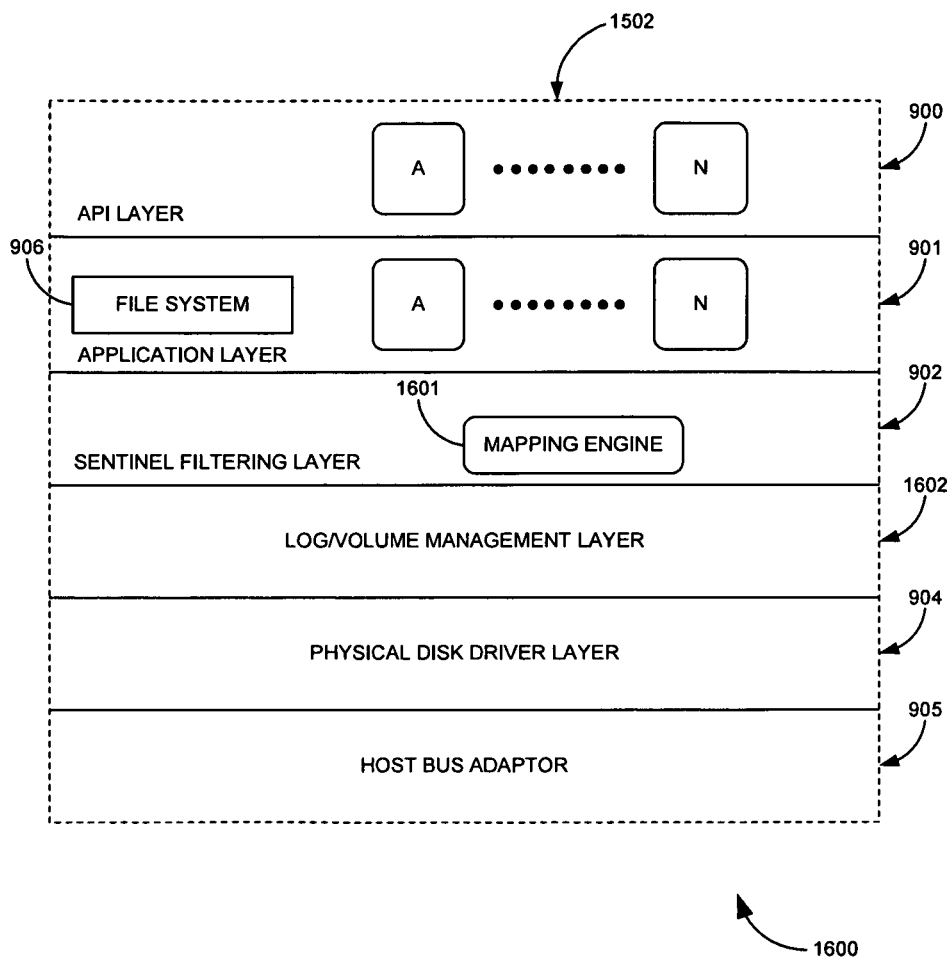
FIG. 16 is a block diagram illustrating components of a client application according to another embodiment of the present invention.

FIG. 16 is a block diagram 1600 illustrating components of a client application analogous to application 1502 according to an embodiment of the present invention. Application or instance 1502 is somewhat analogous to client application 807 described with reference to FIG. 8. API layer 900 and application layer 901 including file system 906 are virtually unchanged from the description of FIG. 9 of this specification. Likewise layers 904 and 905 are identical to the previous version.

In this case, an enhancement for Log volume management is provided and illustrated as layer 1602 of client application 1502. Layer 1602 contains the components responsible for generating metadata and for setting bit flags during log volume write population. The log/volume management layer enables the host system to access and write data to the log volume in either embodiment described with respect to FIG. 15. The same write data that is destined for a primary storage LUN or target space is written to the log volume using a separate LUN or SLUN in the case of a shared volume. In a preferred embodiment, a bit flag is set to mark when a block is locked from access and a second bit flag is set to indicate that writes to the block are complete and are ready for access by a reader. Layer 1602 may, in one embodiment, contain a utility (not shown) that detects when a log file or block is full and automatically sets a flag bit to indicate the state before moving on to the next file or block.

A mapping engine 1601 may provide the true-to-logical offset mapping metadata and frame based metadata so that the true offset and end-write locations are known. Layer 902 may also continue to provide filtering results using onboard metadata and algorithmic function to continue to reduce redundant writes from the same host before actually committing data to a log entry in one embodiment. A disk-locking feature of the system enables rigid log entry journaling and log entry clearing by setting bits in asynchronous or synchronous mode in the case of V-LUN.

Figure 17:
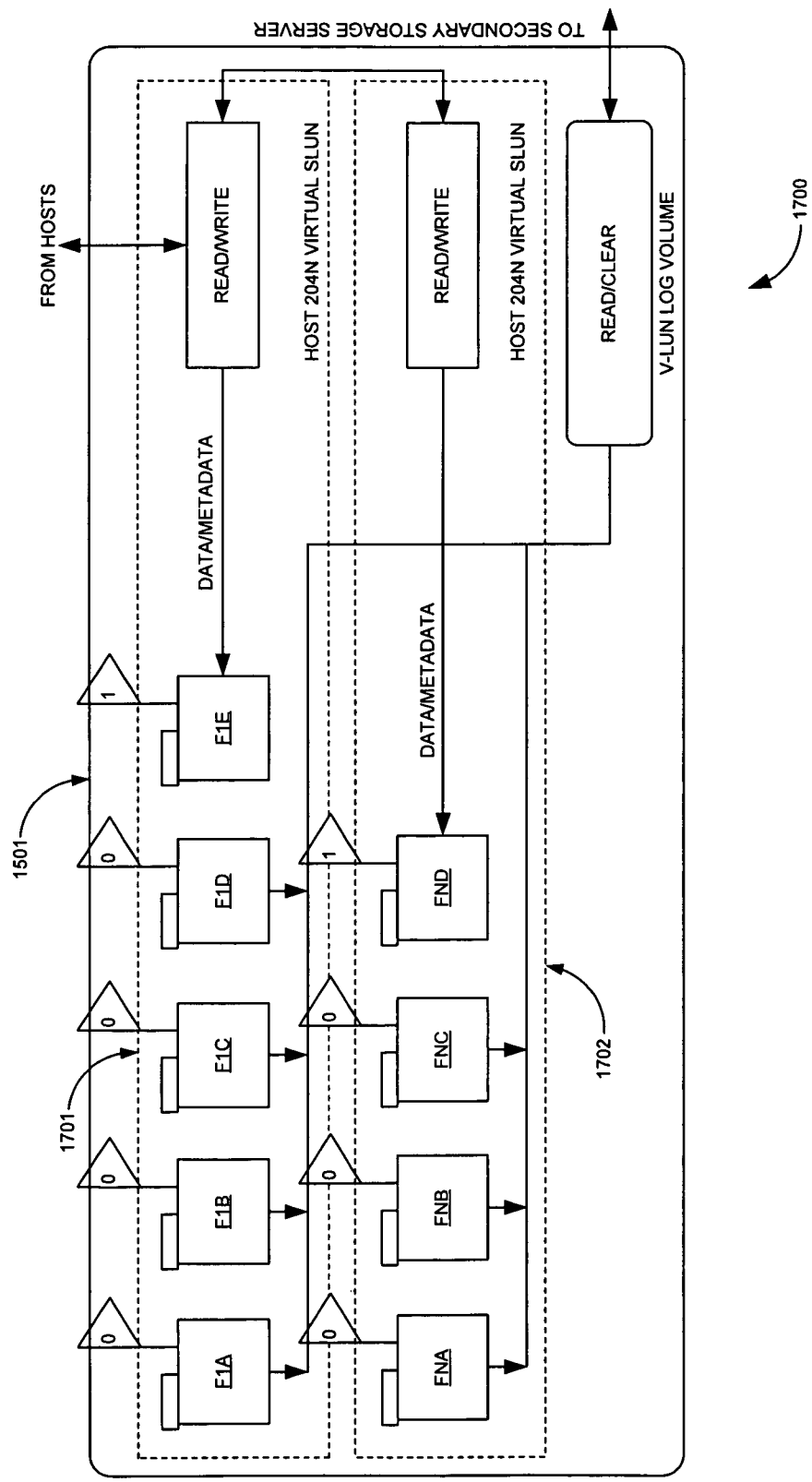
FIG. 17 is a block diagram-illustrating format of a virtual LUN according to yet another embodiment of the present invention.

FIG. 17 is a block diagram 1700 illustrating formatting of a virtual LUN Log volume according to another embodiment of the present invention. Diagram 1700 logically illustrates a virtual LUN portion of a secondary storage disk or server memory allocation, herein referred to as V-LUN LOG Volume 1501. Virtual LUN Log volume 1501 contains a data write transactional record 1701 for an exemplary host 204-1, and a data write transactional record 1702 for exemplary host 204n. In one embodiment, Log volume 1501 has a LUN number assigned identifying it as a virtual device for use by hosts charged with backing up data. In this case, the hosts may have a primary storage LUN device (data volume) and a virtual Log LUN (log volume). In another embodiment, each host may be assigned a dynamic portion of volume 1501 for writing data to wherein each assigned portion is identified with a SLUN.

In this case, transactional records including write data and metadata are physically separated from each other by SLUN. Transaction record 1701 is formatted according to a file system wherein 1701 may appear as a folder containing files F1a through F1e. Each block has a bit flag set [0] to indicate when it is locked and one bit flag set [1] to indicate when the writes to it are complete and ready for read access as described further above. It is noted herein that the representation of record 1701 as a set of files is exemplary only. Lower level block representation may also be the rule. In the case of record 1701, each file F1a-F1d represents a sequential portion of a data write each portion or file being full and of the same number of bytes. A bit flag value of [0] represented by a triangle flag icon containing the value 0 is set indicating that the files are completed and free for use by the host. File F1e has a 1-bit flag value indicating that it is locked from access.

Host nodes may access volume 1501 via FC channels to the secondary storage server and may perform read/write operations within volume 1501 in tandem with other operating host nodes. In this case, records 1701 and 1702 are being created almost simultaneously by two identified hosts 204-1 (1701) and 204n (1702). Read/Write operations are performed from hosts accessing their appropriate SLUNs in volume 1501.

The secondary storage server is running a READ/CLEAR operation on both log entries 1701 and 1702. Each file of each record is sequentially read and cleared if the bit flag is set for read access. As files F1e and Fnd become available, they will in turn be read and cleared. It is noted herein that in a preferred embodiment all data read from log entries 1701 and 1702 is backed up to a secondary near term storage disk before the data is erased or cleared from the entries. The actual memory space in use by V-LUN log volume 1501 at any given point in time may vary according to actual use by hosts. Memory is allocated dynamically as it is needed to contain the write data and associated metadata. Likewise as data is cleared, the actual memory space may be, in one embodiment, de-allocated and used for other purposes.

In one embodiment, log volume 1501 may contain only metadata enabling the secondary storage server to read directly from data volumes on the primary storage system. However, logging of actual write data eliminates direct read overhead from primary storage. It is noted herein as well that there may be separate V-LUN log volumes for separate hosts, in which case only one host would access and write to one volume.

Figure 18:
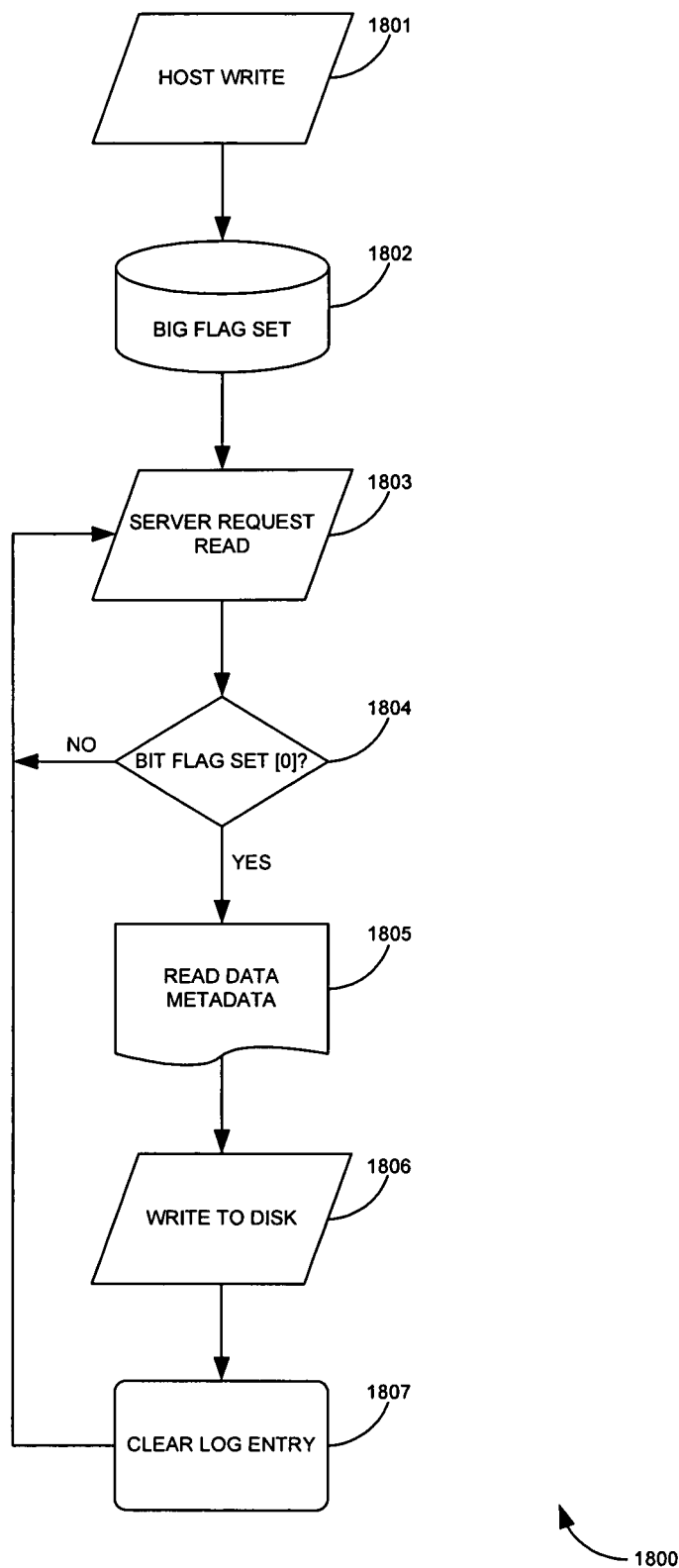
FIG. 18 is a process flow diagram illustrating log volume access synchronization according to an embodiment of the present invention.

FIG. 18 is a process flow diagram 1800 illustrating log volume access synchronization according to an embodiment of the present invention. At step 1801, a host accesses and writes data to a log volume in conjunction with writing to primary storage. It is not specifically important which write location is populated first. In the case of the data volume in primary storage, the write session follows the protocols of RAID or other primary storage system type. In the case of the log volume, the write session is limited to pre-sized containers or files limited to a certain number of bytes of data.

At step 1802 the host sets a bit flag when each file is full of data, the bit indicating that the file or container of data is read ready. A byte limit may be imposed for a write session whereby when one container has reached the limit of data then a next container is created or if already created, used for the next write data until the session is over for that log entry. Steps 1801 and 1802 may represent multiple writes being conducted by multiple hosts. Moreover, each write session may contain multiple data files if a file system is used. Likewise granularity may be ordered to specific regions within a file, each region representing a portion of the logical volume being protected.

At step 1803, the secondary storage server requests to read data from the log volume. This step may be initiated periodically wherein the server according to a time schedule accesses the log volume to read and clear any read-ready files. In one embodiment, reads can be based on the amount of changes made, which may be tracked by a collection of set bits. In one embodiment, step 1803 is performed at boot and the server has connection to the log volume as long as the system is up and running.

When attempting to read a log entry containing write data, the server determines which bit value is set for each file scanned. If a file is locked then the next file is scanned and so on until the server finds a read ready file or data container. If the appropriate bit value is detected, then the server may read the data within the container at step 1805.

The read step is incrementally followed by a write step 1806 whereby the server writes the read data to disk or other near term storage on behalf of the host. In a preferred embodiment, data journaling is sequential and data reading and backup to disk is likewise sequential. In step 1807, the server, having completed step 1806 for a file or for a log entry then clears the read files or data containers of data. The host may then reuse the cleared space for more data writes.

Each log entry may be generic to one data write session performed by one host and may include embedded metadata describing the write data, offset location in primary storage of the data write, the payload length of the data frames, source and target identification, time stamp data, and so on. In one embodiment, a certain amount of redundant data may be included in the log volume or even in a log entry from a single host. However, once data is read a snapshot view or bitmap image of previous write activity already backed up can be used to eliminate near term storage of redundant data. Likewise a metadata comparison between metadata about data stored and metadata about data read can be used to eliminate any redundant writes.

One with skill in the art will recognize that process 1800 may contain more or fewer steps than those illustrated without departing from the spirit and scope of the invention. Depending on configuration of a log volume and whether it is software managed, as in a virtual LUN, or hardware managed as a disk partition, other steps may be introduced to process 1800 without departing from the spirit and scope of the present invention. In addition, SCSI, FC, or other network communication protocols may be implemented on top of the client and server application stacks to enable direct communication between hosts and the server through the supporting switch fabric or Ethernet switch.

Writing to a log volume and then reading from that volume and clearing the data is just one preferred method of acquiring data for backup from one or more host nodes. This method may reduce or eliminate, in some embodiments, any need for direct access to a SAN-based primary storage system from the secondary storage facility. Likewise, many enhancements related to speed of journaling and speed of data acquisition can be implemented using a virtual log volume approach.

The methods and apparatus of the present invention should be afforded the broadest possible interpretation in view of the many possible embodiments described. The method and apparatus of the present invention is limited only by the following claims.

What is claimed is:

1. A method, implemented at a first computer system that includes one or more processors and system memory, of causing a second computer system to perform a data read operation against a first storage system, the data read operation performed by the second computer system according to a record generated by the first computer system in connection with the first computer system writing the data to the first storage system, the method comprising:
   (a) the first computer system executing at least one data write of the data to the first storage system over a first communication channel;
   (b) the first computer system identifying at least one logical offset of a particular storage location to which the data was or is to be written to the first storage system, the at least one logical offset being based on a logical view of the first storage system that is presented to the first computer system;
   (c) the first computer system identifying at least one physical offset of the particular storage location to which the data was or is to be written to the first storage system, the at least one physical offset being different from the at least one logical offset, identifying the at least one physical offset including the first computer system mapping the at least one logical offset to the at least one physical offset based on a pre-configured knowledge of the first storage system; and
   (d) the first computer system forwarding a record to the second computer system over a second communication channel, the record identifying the at least one physical offset, the record being configured to cause the second computer system to perform at least the following upon receiving the record:
   access the first storage system to read the data from the first storage system at the particular storage location identified by the at least one physical offset;
   read the data from the particular storage location; and
   write at least a portion of the data, or a derivative thereof, to a second storage system.

2. The method of claim 1, wherein the first computer system is a LAN connected server and the first storage system is a SAN-based storage system.

3. The method of claim 2, wherein the SAN-based storage system is accessible through at least one of a Fibre Channel network and an Ethernet network.

4. The method of claim 1, wherein in step (b) the first computer system also identifies one or more of: origin and destination machine address information, physical payload length information, and at least one mapping value pre-known and associated with the first storage system.

5. The method of claim 1, wherein in step (c) the identifying is achieved via an algorithm using at least one mapping value as a variable.

6. The method of claim 1, wherein in step (d) the record is forwarded over a TCP/IP-enabled connection.

7. The method of claim 1, wherein the first storage system is accessed by the second computer system for read by at least one of through a Host Bus Adaptor and Fibre Channel network and through an Ethernet network.

8. The method of claim 1, wherein the second computer system writing at least a portion of the data, or a derivative thereof, to the second storage system comprises the second computer system applying changed data of the first computer system to the second storage system to provide time-based recovery.

9. The method of claim 1, wherein the first computer system has a configurable host view of its storage volume and access to time-stamped versions of its backed up information, wherein the versions are compatible with the configurable host view.

10. The method of claim 9, wherein the configurable host view is comprised of at least one of a file, a data set, and a volume.

11. The method of claim 1, wherein the second computer system reads from at least one of a first storage system buffer and a first storage system cache.

12. The method of claim 1, wherein the second computer system performs a mapping function using at least one of a standard protocol and a custom application program interface.

13. A host system, comprising a processor and a memory, that is configured to cause a server system to perform a data read operation against a first storage system, the data read operation performed by the server according to a record generated by the host system in connection with the host system writing the data to the first storage system, including at least the following;
  (a) the host system executing at least one data write to the first storage system over a first communication channel;
  (b) the host system identifying at least one logical offset of a particular storage location to which the data was or is to be written to the first storage system, the at least one logical offset being based on a logical view of the first storage system that is presented to the server system;
  (c) the host system identifying at least one physical offset of the particular storage location to which the data was or is to be written to the first storage system, the at least one physical offset being different from the at least one logical offset, identifying the at least one physical offset including the server system mapping the at least one logical offset to the at least one physical offset based on a pre-configured knowledge of the first storage system; and
  (d) the host system forwarding a record to the server system over a second communication channel, the record identifying the at least one physical offset.

14. The system of claim 13, wherein the host is a LAN connected server and the first storage system is a SAN-based storage system.

15. The system of claim 14, wherein the SAN-based storage system is accessible through at least one of a Fibre Channel network and an Ethernet network.

16. The system of claim 13, wherein the record host system also identifies one or more of: origin and destination machine address information, physical payload length information, and at least one mapping value pre-known and associated with the first storage system.

17. The system of claim 13, wherein the identifying is achieved via an algorithm using at least one mapping value as a variable.

18. A computer program product comprising one or more hardware storage devices having stored thereon computer-executable instructions that, when executed by one or more processors of a first computer system, cause the first computer system to generate a record in connection with the first computer system writing the data to a first storage system, the record being configured to cause a second computer system to perform a data read operation against the first storage system, including at least the following:
  (a) the first computer system executing at least one data write of the data to the first storage system over a first communication channel;
  (b) the first computer system identifying a particular storage location to which the data was or is to be written to the first storage system, the at the particular storage location being identified based on a logical view of the first storage system that is presented to the first computer system; and
  (c) the first computer system forwarding a record to the second computer system over a second communication channel, the record including information for identifying the particular storage location, the record being configured to cause the second computer system to perform at least the following upon receiving the record:
    access the first storage system to read the data from the first storage system at the particular storage location;
    read the data from the particular storage location; and
    write at least a portion of the data, or a derivative thereof, to a second storage system.

19. The computer program product as recited in claim 18, wherein the second computer system writing at least a portion of the data, or a derivative thereof, to the second storage system comprises the second computer system applying changed data of the first computer system to the second storage system to provide time-based recovery.

20. The computer program product as recited in claim 18, wherein the second computer system reads from at least one of a first storage system buffer and a first storage system cache.

* * * * *